(12) United States Patent
Sheard et al.

(10) Patent No.: US 6,332,109 B1
(45) Date of Patent: Dec. 18, 2001

(54) GEOLOGICAL DATA ACQUISITION SYSTEM

(76) Inventors: Stuart Nicholas Sheard; Terry John Ritchie, both of c/o M.I.M. Exploration Pty Ltd. Level 2, Prime Business Centre 55 Little Edward Street, Spring Hill, Qld 4000 (AU)

( * ) Notice: Subject to any disclaimer, the term of this patent is extended or adjusted under 35 U.S.C. 154(b) by 0 days.

(21) Appl. No.: 09/434,501

(22) Filed: Nov. 5, 1999

(51) Int. Cl.[7] ....................................... G01V 3/38
(52) U.S. Cl. ................................ 702/11; 324/357
(58) Field of Search ......................... 702/6, 7, 14, 17, 702/18, 16, 11, 12, 13; 367/76, 77, 117; 324/360, 359, 358, 357, 347

(56) References Cited

U.S. PATENT DOCUMENTS

| | | | |
|---|---|---|---|
| 5,276,655 | * | 1/1994 | Rialan et al. ......................... 367/77 |
| 5,550,787 | * | 8/1996 | Rialan et al. ......................... 367/77 |
| 5,724,241 | * | 3/1998 | Wood et al. ......................... 702/14 |
| 5,978,313 | * | 11/1999 | Longaker ......................... 367/38 |

* cited by examiner

Primary Examiner—Donald E. McElheny, Jr.
(74) Attorney, Agent, or Firm—Kenyon & Kenyon

(57) ABSTRACT

A geological data acquisition system (1) for obtaining data from a geological body (2). System (1) includes a plurality of nodes (3) for simultaneously obtaining respective first measurement signals representative of predetermined characteristics of body (2) at a corresponding plurality of equally spaced apart locations adjacent to the top surface (4) of body (2). First memory means (5) are disposed at each node (3) for selectively storing first data representative of the first measurement signals. A processing center (7) is remote from nodes (3) and selectively obtaining the first data from each memory means (5).

29 Claims, 11 Drawing Sheets

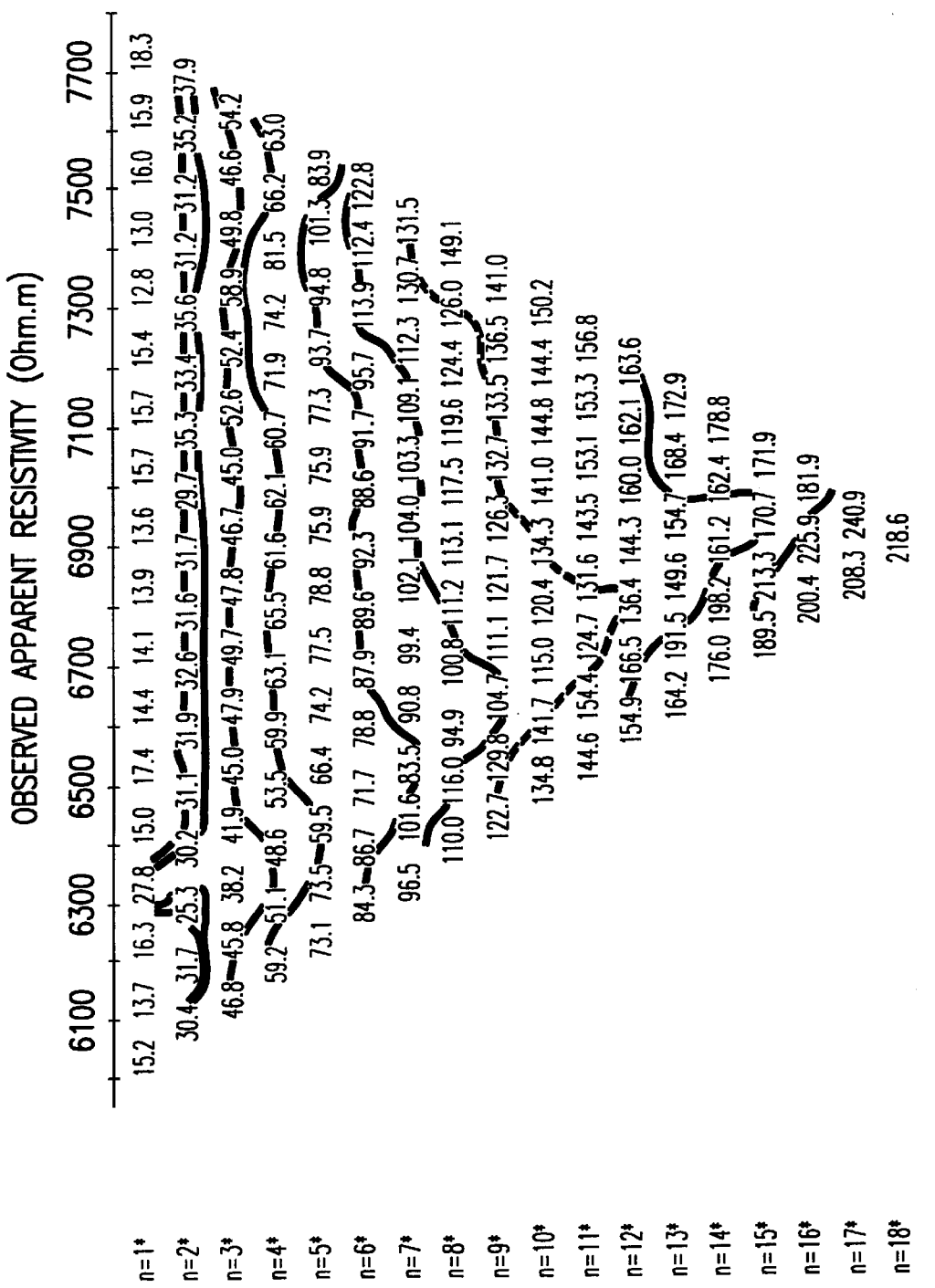
FIG. 8
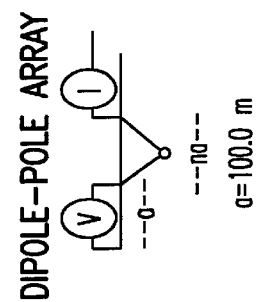

GEOLOGICAL DATA ACQUISITION SYSTEM

The present invention relates to a data acquisition system and in particular to a geological data acquisition system.

The invention has been developed primarily for geophysical surveys utilising controlled sources and natural sources for identifying metalliferous regions within a geological body, and will be described herein after with reference to that application. However, it will be appreciated that the invention is not limited to this particular field of use and is also applicable to other geological, geotechnical or environmental surveys.

The purpose of exploration geophysics is to produce images of sub-surface physical properties. The value of the images produced and manifested is dictated by the available spatial resolution and the property accuracy at all points. While this information can also be used to surmise or interpret chemistry and rock type, this is of secondary importance since such interpretations will be limited to the accuracy of the physical property image.

Owing to fundamental physical principles of linearity and reciprocity, the quality of the images produced by the available geophysical imaging systems is dictated by 1. the multiplicity of source/receiver combinations or field/field response sites;
2. the combination of linearity and instantaneous dynamic range of the measurements (which are limited by a wide range of noise considerations some of which do not directly relate to system design);
3. the bandwidth in the measurements (also limited by various noise considerations in addition to basic system design); and
4. one or more indicators related to the degree of confidence in the accuracy of the images (estimates of sensitivity and error).

While such limitations are valid for all available prior art systems, there are additional problems compromising their ability to take useful measurements and therefore produce valuable images. More particularly, the prior art systems:

1. are custom made and configured for one particular type of electrical geophysical technique;
2. generally employ a single type of sensor; and
3. rely upon field operation techniques that were developed over twenty years ago.

These compromises have resulted in the proponents of the prior art systems trying to glean ever diminishing amounts of information from data sets of marginal quality. Moreover, although some improvements to equipment has been made, it is only incremental. The state of the art remains constrained to 30 year old designs and methodologies.

Some of these limitations have been recognised in the seismic exploration industry, where use is made of distributed acquisition systems and 3-D surveys. However, seismic surveys involve measuring motion or pressure only and the hardware techniques are not translatable to electrical geophysics. The latter employs a much wider range of sensors that are several orders of magnitude more demanding in terms of bandwidth, and also more demanding in terms of linearity and dynamic range.

It is an object of the present invention, at least in the preferred embodiment, to overcome or ameliorate at least one of the deficiencies of the prior art.

According to a first aspect of the invention there is provided a data acquisition system for obtaining data from a geological body, the system including:

a plurality of nodes for simultaneously obtaining respective first measurement signals representative of predetermined characteristics of the body at a corresponding plurality of spaced apart locations at or adjacent to the surface of the body;

first memory means disposed at each node for selectively storing first data representative of the first measurement signals; and a processing centre remote from the nodes for selectively obtaining the first data from the memory means.

Preferably, the first signals are obtained at a first predetermined time and the nodes also obtain respective second measurement signals at a second predetermined time, wherein the first and second times are temporally spaced. Preferably also, the memory means stores second data representative of the second signals. Even more preferably, the fist data and the second data allow a determination of the first time and the second time.

Preferably also, the body is provided with an actuating signal and the system includes an input sensor means for obtaining an input signal representative of one or more characteristics of the actuating signal at the first time and the second time. More preferably, the input means includes second memory means for storing input data representative of the input signal. More preferably, the processing centre selectively obtains the second data from the second memory means. Even more preferably, the processing centre is responsive to the first and the second data for calculating geological or geophysical parameters of the body.

In a preferred form the nodes are linked to the processing centre sequentially. More preferably, each node is connected to the or each adjacent node in series, and one of the nodes is connected in series to one adjacent node and to the processing centre. More preferably the connections between the nodes is effected by electrical cabling. In other embodiments, however, alternative means such as optical cables or radio frequency or other wireless links are used.

Preferably, the processing centre provides control signals to the nodes and the input sensor means for coordinating the simultaneous acquisition of the measurement signals and the input signals. More preferably, the control signals actively compensate for transmission delays between the nodes. Even more preferably, the control signal actively compensate for transmission delays between the processing centre and the one or more adjacent nodes and between the transmission centre and the input means.

According to a second aspect of the invention there is a method for obtaining data from a geological body, the method including the steps of:

simultaneously obtaining with a plurality of nodes respective first measurement signals representative of predetermined characteristics of the body at a corresponding plurality of spaced apart locations at or adjacent to the surface of the body;

selectively storing first data representative of the first measurement signals in first memory means disposed at each node; and locating a processing centre remote from the nodes for selectively obtaining the first data from the memory means.

Preferably, the method includes the additional steps of:

obtaining the first signals at a first predetermined time; and obtaining with the nodes respective second measurement signals at a second predetermined time, wherein the first and the second times are temporally spaced.

Preferably also, the method includes the step of storing second data representative of the second signals in the memory means. Even more preferably, the first data and the second data allow a determination the first time and the second time.

Preferably also, the method includes the steps of:

providing the body with an actuating signal; and obtaining with an input sensor means an input signal representative of one or more characteristics of the actuating signal at the first time and the second time.

More preferably, the method includes the step of providing the input means with second memory means for storing input data representative of the input signal. More preferably, the method includes the step of the processing centre selectively obtaining the second data from the second memory means. Even more preferably, the processing centre is responsive to the first and the second data for calculating geological or geophysical parameters of the body.

In a preferred form the nodes are linked to the processing centre sequentially. More preferably, each node is connected to the or each adjacent node in series, and one of the nodes is connected in series to one adjacent node and to the processing centre. More preferably the connections between the nodes is effected by electrical cabling.

Preferably, the processing centre provides control signals to the nodes and the input senor means for coordinating the simultaneous acquisition of the measurement signals and the input signals. More preferably, the control signals actively compensate for transmission delays between the nodes. Even more preferably, the control signal actively compensate for transmission delays between the processing centre and the one or more adjacent nodes and between the transmission centre and the input means.

A preferred embodiment of the invention will now be described, by way of example only, with reference to the accompanying drawings in which:

FIG. 1 is a schematic representation of a data acquisition system according to the invention;

FIG. 2 is a schematic view of a nodes that measures a voltage;

FIG. 3 is a schematic view of a node that measures a magnetic field strength;

FIG. 4 is a schematic plan view of an alternative node layout;

FIG. 5 is a schematic plan view of a further alternative node layout;

FIG. 6 is a schematic plan view of another alternative node layout;

FIG. 7 is a schematic plan view of another node layout;

FIG. 8 illustrates a section for a body of earth showing resistivity values against a pseudo depth estimation which is known commonly as a resistivity pseudo section, the section being obtained using the system of FIG. 1;

FIG. 9 illustrates a section for a body of earth showing chargeability values against a pseudo depth estimation which is known commonly as a chargeability pseudo section, the section being obtained using the system of FIG. 1;

FIG. 10 is a chart of the resistivity of a body of earth showing depth estimation that has been calculated with the system of FIG. 1 configured in the layout of FIG. 4;

FIG. 11 is a chart of the chargeability of a body of earth showing depth estimation that has been calculated with the system of FIG. 1 configured in the layout of FIG. 4;

FIG. 12 is a chart of combined resistivity and chargeability model for the body under investigation showing depth estimation; and FIG. 13 is a cross sectional view of the drilling results conducted as indicated in FIG. 11.

Referring to FIG. 1 there is illustrated a geological data acquisition system for obtaining data from a geological body 2. System 1 includes a plurality of like nodes 3 for simultaneously obtaining respective first measurement signals representative of predetermined characteristics of body 2 at a corresponding plurality of equally spaced apart locations adjacent to the top surface 4 of body 2. First memory means 5 (not shown) are disposed at each node 3 for selectively storing first data representative of the first measurement signals. A processing centre 7 is remote from nodes 3 and selectively obtains the first data from each memory means.

A current source 8 provides body 2 with a time varying actuating current via conductors 9 and spaced apart electrodes 10. The electrodes are embedded in body 2 and extend upwardly form surface 4. An input sensor means in the form of a digital current meter 11 obtains an input signal representative of the time varying current flowing through conductors 9. This data signal is provided to a node 13 and subsequently provided to centre 7, when requested. In this embodiment, node 13 is the same as nodes 3, with the exception that it is responsive to the excitation signal rather than the measured effects of that signal on body 2.

In other embodiments the input sensor obtains another characteristics of the actuating signal provided by source 8. For example, some embodiments, that characteristic is the voltage at the sensor, while in other embodiments the characteristic is the magnetic field at the sensor induced by the current source. In still further embodiments the input means obtains more than one characteristic.

Meter 11 includes second memory (not shown) for storing data representative of the input signal, which will be referred to as second data. Preferably, the second data is obtained at predetermined times which correspond to the times that nodes 3 obtain the first measurement signals. Moreover, meter 11 is responsive to a control signal from centre 7 for downloading the second data from the second memory to centre 7.

System 1 is based upon single channel distributed acquisition nodes that collect between 19 and 24 bits per sample, depending upon sampling frequency, of non-aliased linear data with a band width in the range of 0 to 20 kHz. This data is collected in memory means 5 and, upon request, relayed to centre 7. Preferably, centre 7 is transportable and more preferably mounted on a recording vehicle.

In other embodiments a different number of bits per sample are obtained.

Adjacent modes 3 are serially connected by local area network (LAN) cables 12. In this embodiment cable 12 is Category 5 cable. In other embodiments cables 12 are substituted by optical cables or radio frequency or other wireless links.

Each node 3 is accurately synchronised and the data stored in each means 5 is streamed into centre 7 and recorded at the end of each event. Centre 7 includes acquisition software for interrogation of all the incoming data from each node and any other sensors used, such as meter 11. Centre 7 includes display means (not shown) and, if desired, the raw data from the memory means is displayed as it arrives. In this embodiment the data is processed on site and field plots produced. In other embodiment, however, the data is collected and processed remotely.

The serial connection between adjacent nodes 3 and centre 7 will be termed a distributed system and is advantageous as it avoids a multiplicity of cables attached between various components. That is, only one cable link is required to extend from centre 7 to connect it to all the nodes. Accordingly, this configuration offers substantially better noise performance while also allowing greater scope for expandability of nodes. The latter is limited only by logistics and available computer power.

It will be appreciated by those skilled in the art that cable 12 is preferably a multi-core or multi-conductor cable.

Moreover, as meter 11 is obtaining data of the quantum and timing of the input signal, it is no longer critical to utilise a high accuracy current source to generate the actuation signal. That is, centre 7, in embodiments where it performs the data processing, produces resultant data from theoretical clean waveforms used in interpretation packages. It also allows a simultation of the effect of different input waveforms on the geological body.

Noise problems are further reduced as the data from each channel is collected simultaneously and, accordingly, considerable noise cancellation occurs. The time series data allows simple signal processing procedures to remove cultural noise, which when combined with selective stacking routines and other remote reference noise cancellation schemes produces very high quality data. Considerable area or line kilometers of quality data can be captured rapidly.

The first and second data are continuously streamed from the nodes to centre 7. For nodes other than that node immediately adjacent to centre 7, the respective first data is sequentially progressed via intermediate nodes until it reaches centre 7. Due to the buffer offered by memory 5 the first data is transmitted when no other signal transmission is occurring. Accordingly, the first data is transferred either during or after acquisition of additional data. The particular value of continuous streamed data is the ease of re-processing at later times.

This embodiment is adapted to controlled source surveys in that system 1 accurately monitors the input current. This current data is then used to deconvolve the first data and allow the calculation of desired geological or geophysical parameters of body 2 via interpretation techniques.

Nodes 3 each include a single channel sensor unit, while centre 7 has at least two input channels. One of those two channels links to a first of the plurality of serially connected nodes 3, while the other is connected to another serially connected node. In some cases the other channel is connected to another remote array by a suitable radio frequency link. The use of single channel units within nodes 3 provides modularity, portability, small size and low weight.

Each node 3 includes of a power supply board, a communication board and a data logging board containing memory. In this embodiment the memory has a capacity of 2 megabytes. In other embodiments different capacities are utilised.

In this embodiment nodes 3 are sensitive to an induced magnetic or electrical signal arising from the varying current waveform that is provided by source 8 and/or natural fields. That is, nodes 3 include respective magnetometers. However, in other embodiments use is made of other magnetic to voltage transducers. For example a coiled conductor and/or a grounded electrode. That is, system 1 is not limited to provided a single type of geophysical data and is selectively configured, as circumstances dictate.

Preferably, nodes 3 include an internal battery source. However, in alternative embodiments power is supplied via external batteries or solar power.

To main accurate synchronisation, system 1 includes timing software at centre 7. This software involves centre 7 sending a pulse through the serially connected nodes, each of which return the pulse following a predetermined delay after receipt. The return time from each box is measured and the travel time for the pulse is calculated. This provides an accuracy of synchronisation that allows a very accurate phase calculations of the signals received by the sensors.

Centre 7 sequentially interrogates each node to check sensor impedances and noise. The resultant data is streamed to centre 7 and recorded on two separate 2 gigabyte drives. In other systems use is made of data storage having other forms and sizes.

As will be appreciated by the teaching herein, system 1 is modular and produces high quality data from array style measurements.

Nodes 3 can use any sensor type and, with suitable software, produce detailed interpretative products with increased resolution and better depth penetration than the known prior art.

Reference is made to FIGS. 4, 5, 6 and 7 which illustrate respective alternative layouts for nodes 3 which include corresponding features denoted by corresponding reference numerals. More particularly, the FIG. 4 layout includes a plurality of daisy chained nodes 3 which are arranged in parallel transversely spaced apart linear arrays which extend longitudinally across surface 4. The number of linear arrays and the number of nodes in each array is determined by the extent of the survey required. Preferably, each array includes the same number of nodes. More preferably, the nodes in adjacent arrays are aligned transversely. In other embodiments, however, the corresponding nodes in adjacent arrays are uniformly longitudinally offset from each other.

In this layout, all the data collected at the individual nodes has to be transmitted to centre 7. Accordingly, the delay in relaying the necessary information to centre 7 will increase greater than proportionally with the number of nodes utilised.

The layout of FIG. 5 is similar to that of FIG. 4 with the exception being that the delays in transmitting the necessary information to centre 7 is decreased. That is, use is made of a plurality of longitudinally extending transversely spaced apart linear arrays of nodes 3 that are collectively joined to centre 7. In this layout, the transmission delay will linearly increase with the number of arrays. However, the delays will increase at a rate greater than proportionally with the number of nodes in each array.

The layout of FIG. 6 includes a centre 7 having a plurality of channels for interacting with respective transversely spaced apart longitudinally extending linear arrays of node 3. Although three arrays are illustrated, in other embodiments use is made of a different number of arrays. As there is a separate channel for each array, the delay in relaying information to centre 7 is independent of the number of arrays.

The layout of FIG. 7 includes the layout of FIG. 1 in that there is a linear array of daisy chained nodes 3 having one such node linked to centre 7 by a Category 5 cable. In addition, a second array of daisy chained nodes 3 is spaced apart from and co-extensive with the first array. This second array includes a node which is linked to centre 7 for wireless communication of data.

Reference is now made to FIG. 3 which illustrates one of the nodes 3 used in system 1. More particularly, the node includes a central processor 21 which receives and transmits signals through the two adjoining cables 12. These cables connected node 3 to adjacent nodes or centre 7 if node 3 is adjacent to centre 7. As will be appreciated by those skilled in the art, if node 3 is the last node in an array, it will only be connected to one other node. Processor 21 is responsive to internal software and external commands from centre 7 for performing the necessary data collection and transmission functions. That software and the data, once collected, are selectively stored in and accessed from memory 5.

Each cable 12 includes four separate conductors 22, 23, 24 and 25. Conductor 22 is the command and timing line which carries the communications between adjacent nodes. Each node and centre 7 will have a predetermined unique address so that an command packets received by a particular node will be either identified as being for that node, and processed accordingly, or otherwise passed to the next node.

Conductor 23 is a data line that carries all the data packets between the nodes and to centre 7.

Conductor 24 is a communication line for auxiliary functions such as a GPS signal or the like.

Conductor 25 is an earth return line which allows node 3 to conduct its measurement function. More particularly, and as shown in the drawing, node 3 includes an earth pin 26 which is linked to processor 21. This pin is electrically connected, via processor 21, to conductor 25 of the cable 12 that extends to the right of node 3 to earth that conductor. A similar arrangement is effected at each node and, consequently, the remote end of the conductor 25 extending to the left of node 3 is also earthed. Processor 21 then samples the voltage between its respective connections with the left extending conductor 25 and the earth pin 26. The same operation occurs at the other nodes in the array. Moreover, the separate samples at the different nodes are synchronised with the sampling of the input signal provided by source 8.

That is, nodes 3 allow centre 7 to determine the voltage at the nodes and the voltage differential between the nodes. Accordingly, an extremely large number of dipole pairs are formed, in that each node forms a dipole with every other node being used in the survey. As the position of the nodes is known, either from pre-placement or through the use of GPS sensors disposed at the respective nodes, it is possible to also determine the distance between the nodes. This provides some redundancy in the information which, in turn, allows error checking. Accordingly, the results of the survey are less susceptible to spurious errors. This robustness is also facilitated through the simultaneous sampling of both the input current, or other input signal, and the output signals which, in this case, is the voltage between adjacent nodes. Such simultaneous sampling allows centre 7 or a corresponding processing means to treat body 2 as a "black box" and to provide a transfer function defining selected properties of that body as indicated by the measured signals.

The accuracy of the samples is preferably eight bit, although other embodiments make use of different sample sizes. It is also preferred that the sample rate is high to cover a wide range of frequencies. It is also preferred that the DC voltage is detected.

In other embodiments, nodes 3 are configured to interact with sensors other than a voltage sensor such as that used in the FIG. 2 embodiment. For example, an alternative sensor arrangement is illustrated in FIG. 3 where corresponding features are denoted by corresponding reference numerals. That is, processor 21 is responsive to the voltage generated across a coil 30. This voltage is indicative of the magnetic field at node 3.

Nodes 3 are particularly suited to the gathering of non-seismic data. Moreover, the nodes are easy to deploy about surface 4 and easily regathered after a survey has been conducted.

The use of single cables extending between adjacent nodes greatly reduces the amount of cabling required. This also facilitates deployment and regathering of the nodes by reducing the required labour input and logistics involved.

System 1 has been trialed and sample results are shown in FIGS. 8, 9, 10 and 11 with a layout in accordance with FIG. 4. More particularly, the results were produced using an IP section and indicated a good target at 150 meters. This target was drilled and the desired metalliferous ore found. At this site there is a thick top layer (overburden) which is electrically conductive which makes it impossible for conventional systems to achieve the necessary depth penetration to indicate a target.

FIG. 8 is a pseudo section of the observed apparent resistivity of the body of earth under consideration. The abscissa is indicative of the relative location on the body and is expressed in terms of metres, while the ordinates are expressed in terms of the separation between the nodes from which the voltage reading was derived. As illustrated, system 1 accommodates a large number of nodes and as such, good depth penetration is achieved.

The calculated resistivity at the various points is expressed in FIG. 8 in Ohm.m and distinct lines of equi-resistivity are shown.

FIG. 9 is a corresponding plot for the observed chargeability of the same body of earth. This chart is generated by measuring the decay of the surface voltage following a fall in the input current provided by source 8.

The charts provided in FIG. 8 and FIG. 9 are interactively processed to provide the charts shown in FIG. 10 and FIG. 11 respectively. That is, the Figures illustrate the resistivity and chargeability of the body based upon the data collected at the nodes.

FIG. 10 allows the estimation of the depth of the resistive material in body 2. In this case, that resistive material is an oxidised deposit.

FIG. 11 shows that body 2 includes a discrete sub-surface deposit of high chargeability. However, this deposit is disposed below a surface deposit of relatively high conductivity. Prior art systems would not have been able to accurately detect the sub-surface deposit using conventional arrays due to the presence of the conductive surface deposit. Even if such prior systems could be adapted to provide such results, the time and expense involved would be prohibitive.

FIG. 12 illustrates a combined resistivity and chargeability model for body 2 that has been calculated from the data obtained from nodes 3. Additionally, FIG. 13 illustrates the drilling results indicated in FIG. 12.

In some embodiments, a number of surveys are conducted on the body and the results of those separate surveys are correlated to provide the ultimate results.

System 1 is applicable to the acquisition of controlled source electromagnetic data, induced polarisation data including spectral information, magnetometric induced polarisation, controlled source magnetotelluric data, magnetotelluric data and standard electromagnetic data. The system is also applicable to the acquisition of other data sets such as seismic data. It will also be appreciated that system allows processing both in the time and frequency domain.

As both the input signal and the output signals are measured accurately and simultaneously system 1 is able to provide useful survey results for bodies of earth that would be unsurveyable by prior art methods. Moreover, system 1 makes use of high bandwidth measurement from many nodes which allows the extraction of significantly more data than prior art systems and the calculation of more accurate and meaningful results.

System 1 is also applicable to the mapping of acid leakage in mines. That is, the water carrying such acid is more conductive than the surrounding earth and will be detectable by system 1.

In some embodiments nodes 3 communicate with each other to share or exchange information. In further embodiments multichannel nodes are used.

System 1 is a distributed acquisition system which makes use of analog-to-digital conversion at nodes 3. This provides a variety of advantages, such as:

1. a broad measurement bandwidth, in this case from DC to 22 kHz;
2. a large channel capacity, in this case 100 channels, although in other embodiments more channels are used;
3. a virtually perfectly matched system distortion for all channels; and
4. an unlimited separation between recording location at centre 7 and the measurement positions at respective nodes 3.

In this preferred embodiment use is made of Sigma-Delta analog-to-digital conversion technology which provides:

1. guaranteed un-aliased, uniformly sampled or equally spaced data;
2. maximum bandwidth per sampling rate; and
3. an instantaneous dynamic range and linearity of about 22 bit, or 132 dB, equivalent at 100 samples per second. System 1 is, however, operable over a range of sample rates. By way of example, when operating at 48,000 samples per second the equivalent linearity is about 16 bit or 96 dB.

In other embodiments use is made of instantaneous gain control which, while affording good instantaneous dynamic range, does not also afford the same linearity over that range.

All the channels of system 1 include a high input impedance in the order of 10 megohms. Preferably, this impedance is frequency independent over the desired operating range to assist in maintaining relatively low system noise. Moreover, the high input impedance, in combination with the large instantaneous dynamic range and linearity, allows the use of a hugh range of input devices. For example, all known electrical geophysical methods sensors are accommodated by system 1. This flexibility and the large channel capacity make system 1 applicable to:

1. all known or documented electrical geophysics techniques such as controlled source induction methods, controlled source galvanic methods, natural field methods including magnetotellurics, tellurics, and self-potential;
2. alternative or hybrid methods which have either seldom or never been practiced before. For example, when applied to standard induced polarisation grounded line excitations, system 1 is, in some embodiments, configured to measure and calculate E-field/H-field responses in addition or as opposed to classical E-field/current responses.
3. procedures and methodology using unconventional sensors such as metal potential electrodes for induced polarisation surveys, which speeds up and reduces the materials costs of surveys; and
4. a range of non-electrical geophysics applications including seismic, piezoelectric, large channel capacity industrial and mining sensor monitoring. An example of the last mentioned category includes measurements such as rock strain and vibration, machinery vibration, temperature, gas content, humidity, pressure, and the like.

System 1 avoids a number of prior art limitations by making use of the frequency independent high input impedance referred to above. Most known electrical geophysical systems have characteristics that lead to:

1. phase distortion or polarisation. In the case of induced polarisation surveys this is catastrophic and effectively corrupts any data.
2. non-linearity owing to current flow across metal potential electrodes; and
3. sensor dependent system distortion. That is, different system distortion for sensors with different impedances.

In controlled source applications such as that used in the present embodiment, the practice is to measure all excitations with the same linearity/accuracy as all other response channels. This plays an important role in allowing:

1. an accurate deconvolution of the excitations;
2. response domain and waveform transformations;
3. casing expense and other constraints on both the excitation transmitter and the electronics array conversion;
4. frequency domain telluric cancellation; and
5. the operation of multiple excitations simultaneously.

System 1 also accommodates the retention of all raw data. In this embodiment that data is stored at centre 7 as time series samples. In other embodiments alternative storage methodologies are followed. In any event, the retention of this information allows:

1. post-processing with improved algorithms tailored to changing noise conditions;
2. ease of continued testing and development of improved processing algorithms;
3. the ability to observe and diagnose problems or noise sources; and
4. the ability to glean startup transient response information.

As all the uniformly spaced data samples are stored, a scheme of acquiring data in limited bandwidth segments is utilised. Such a scheme is essential to keep data volumes at an acceptable level. This becomes particularly relevant in circumstances where a large number of channels are employed.

Large system channel capacity leads to several important advantages beyond the obvious ones of source/receiver multiplicity and economies of scale. Some of these advantages are:

1. sufficient flexibility is provided in sensory input that in some embodiments use is made of the overlap in different geophysical or geological exploration methods. That is, joint or simultaneous surveys are performed making use of common sensor types and array layout. For example, both magnetotellurics and induced polarisation surveys utilise a large number grounded line dipoles. Once a crew have prepared an induced polarisation survey layout, it takes very little additional effort and time to use system 1 to collect magnetotellurics data. Hence, induced polarisation surveys can be run that also collect magnetotellurics data for negligible additional cost;
2. allowable reading times and data quality that are greatly increased in array measurements. For example consider system 1 in the form of a gradient array with 10 lines of 20 dipoles each. System 1 is configured to read all channels at once or otherwise in two setups. Based upon a normal operating environment, the total reading time will be 4 hours or 8 hours respectively. The largest known commercially available system, however, only offers a 16 channel capacity. Accordingly, with such a system, assuming 8 separate excitations or bipoles were required and the reading time is 30 minutes, would involve a total reading time for a single receiver 16 channel system 50 hours;

3. does not necessitate the use of multiple receivers for large arrays. That is, one approach to the limited channel capacity of the prior art systems is to utilise multiple receivers simultaneously. Although such arrangements are known in commercial systems, it is unusual as it results in a higher cost per channel for the survey due to the requirement for additional operators; and 4. for controlled source surveys, reading along multiple lines provides information regarding current flow and eddy current dispersion in directions perpendicular to the line, thereby greatly increasing the information content.

System 1 has been developed to make use of a number of principles of the physics of the earth electrical properties. These include the principles of linearity, superposition, and reciprocity. These allow system 1 to provide some extraordinary possibilities in manipulating and combining sensor information. Consider the following general scenario of system 1 utilising n receiving dipoles or bipoles. For the purpose of the illustration n will be set at 100. These dipoles or bipoles are made up of n-2 spaced apart electrodes between which the voltages are measured. It is possible from this to construct $[n-1]!(9\times10^{155})$ different two electrode dipoles from the measured data set. In this scenario the number of truly independent pieces of information is still n, although additional information can in fact be gleaned out of such manipulations. However, as would now be apparent to those skilled in the art from the teaching herein and in consideration of excitation transformations and the resulting multiplicity of source receiver combinations, the advantageous nature of system 1 as compared with known systems becomes even clearer.

The use of an array as described to above will be referred to generally as an "array transformation". Although system 1 provides such transformations it is not limited in this way. That is, system 1 also is configured to provide a variety of other manipulations and calculations such as:

1. combining multiple transmitter dipoles and/or bipoles to form other arrays, be they either classical or non-classical arrays, in grounded line methods, this includes:
   a) measuring both pole-dipole and dipole-pole information without having a back-current present for every measurement;
   b) converting pole-dipole and dipole-pole information to dipole-dipole information;
   c) forming multiple electrode current focusing excitations to either force more current through conductive cover or maximise current density at a position of interest in the sub-surface. This current is either physically provided or mathematically provided; and
   d) forming the equivalent of a non-grounded loop induction source from grounded line sources that share electrodes.

2. combining multiple receiving sensors to form other useful sensor equivalents such as:
   a) forming long bipoles as the sum of all dipoles along a line to serve as a noise reference in telluric cancellation;
   b) forming long bipoles as the sum of all dipoles along a line to serve as cross-reference in natural field surveys as opposed to using inconvenient remote magnetic field sensors;
   c) forming paths to electrode combinations on multiple lines read simultaneously to provide the equivalent, in terms of information content, of TE oriented dipoles (parallel to strike) at every electrode position;
   d) combining a multiplicity of lower quality, less expensive magnetic field sensors, such as flux-gates or magnetoresistive sensors, to form the equivalent, in terms of sensor noise, of more widely spaced expensive sensors while still allowing high spatial resolution measurement at higher signal levels. A particular example of the latter includes high frequency measurements in controlled source induction surveys; and
   e) combining a multiplicity of lower quality; less expensive sensors such as flux-gates, magnetoresistive magnetometers or aluminium electrodes. Reliance is then placed upon the physical principles of spatial coherence of in ground signals to reduce the effective individual sensor noise levels;

3. run multiple transmitters simultaneously at different frequencies and with special procedures and advanced signal processing segregate the individual output/input components. This allows system 1 to effectively double productivity;

4. use grounded line excitation arrays with more than two electrodes but a sufficient number of current monitors to allow segregating the individual output/input responses for the various dipole/bipole source equivalents;

5. form gradient-type measurements in conditions where noise, whether it be vibration, cultural, telluric or the like, in adjacent sensor measurements are roughly the same but the signal components are different;

6. employ seismic and tomographic style imaging techniques to provide alternative, and in many cases faster inversions as opposed to iterative forward modeling and optimisation.

The following is a brief description to further highlight and illustrate some significant features and aspects concerning the signal processing utilised by system 1.

In terms of hierarchy, the ability to implement advanced signal processing depends on many hardware specifications collectively. Having un-aliased, uniformly sampled data affords greatly improved flexibility and power in realm of signal processing. This is especially true in the case of applying technologies and algorithms developed outside the electrical geophysics industry. This plays an important role in the:

1. deconvolution of excitation(s);
2. domain and waveform transformations;
3. array conversion;
4. noise cancellation;
5. pushing effective linearity/resolution past the limits of lease significant bit resolution;
6. easing expense and constraints on transmitter (excitation) design and electronics; and
7. the operation of multiple excitations simultaneously.

Controlled source processing employs an excitation (transmitter) frequency and sampling rate scheme that ensures powerline harmonics fall at even harmonics of transmitter frequencies and that an integer and binary number of samples per transmitted period are obtained. This allows:

1. improved attenuation of powerline noise;
2. the use of Fast Fourier Transforms in deconvolving excitation irregularities;

3. the use of Fast Fourier Transforms in applying various linear filters; and
4. an early implemented gencralised signal processing approach.

Use is made of Halverson stacking prior to frequency domain transformation. This provides important advantages in:
1. linear drift/noise removal;
2. attenuation of even-harmonics (powerline frequencies in MIMDAS scheme);
3. ability to use metal electrodes as potential electrodes; and
4. quality of grounded line EM coupling information (porous pot electrodes suffer higher contact resistance).

Another feature is that of deconvolution of irregularities in the excitation waveforms by way of estimating frequency responses. Both second order statistics (least-squares) and first order statistics frequency response estimations are made providing an alternative to the problem of bias in least-squares estimators. This provides important advantages in:
1. the calculation time of the donconvolution process;
2. the ability to provide both time and frequency domain responses;
3. the ability to calculate arbitrary periodic time-domain responses (triangular waveform, impulse, square wave with arbitrary duty cycle and ramps, etc);
4. the ability to doconvolve sensor distortion (including capacitive coupling in grounded line responses);
5. correct for amplitude bias in frequency responses due to sensor noise;
6. performing frequency domain telluric cancellation (with frequency dependent telluric coefficients); and
7. the ability to implement filtering with arbitrary frequency domain characteristics.

Preferably also, parametric, frequency domain based telluric cancellation is applied. This feature allows:
1. dramatic reductions in noise levels;
2. factors of 100 of greater productivity during very low frequency surveys;
3. improved mineral and rock type discrimination capabilities (spectral IP);
4. electromagnetics surveys with greatly expanded search depths;
5. simultaneous acquisition of controlled source and natural field responses;
6. response difference parameter (RDP) style telluric cancellation; and
7. possibility of calculating un-biased telluric corrected responses.

It is also preferred that selective stacking or outlier removal is utilised, where appropriate, to provide significant improvements in signal-to-noise ratios.

Preferably, use is also made of a wide range of specifically tailored moving average filters specifically designed for providing dramatic powerline and VLF noise attenuation when viewing time domain responses. These filters also provide an improved approach to the standard quasi-logarithmic boxcar averaging schemes employed in most commercial time-domain induced polarisation and electromagnetics systems.

Another advantageous feature is that of specially designed stacking algorithmc for estimating non-linear responses or harmonic distortion. Non-linear induced polarisation responses have the potential of providing enhanced mineral or rock type discrimination.

The natural field processing used in the preferred embodiments employs the following features:
1. A specialised approach to dealing with the problem of bias versus variance in periodogram based response estimation. This method provides a neat alternative to cascade decimation, a standard approach to magnetotellurics processing.
2. In the case of non-cross referenced data, least squares estimators that are optimised for noise in any one of the response measurements—output (usually electric field) or input (usually magnetic field).

Although the invention has been described with reference to a specific example it will be appreciated by those skilled in the art that it may be embodied in many other forms.

What is claimed is:

1. A data acquisition system for obtaining data from a geological body to which an actuating signal is applied at a predetermined location on the body, the system including:
an input sensor means for obtaining an input signal representative of a predetermined characteristic of the actuating signal;
a plurality of nodes for being located at spaced-apart locations on the body, each for simultaneously obtaining a respective first output signal from the body, the first output signal being induced by said actuating signal and being representative of a predetermined characteristic of the body at a position which is at or adjacent to the surface of the body and which corresponds to the location of the respective nodes;
first memory means disposed at each node for storing first data representative of the respective first output signal; and
a processing centre remote from the nodes for obtaining the first data from each first memory means.

2. A system according to claim 1, the system being adapted for the first output signals to be obtained by the nodes at a predetermined first time and for each node to also obtain a respective second output signal at a predetermined second time which is temporally spaced from said first time.

3. A system according to claim 2 wherein the first memory means at each node is adapted to store second data representative of the respective second output signal.

4. A system according to claim 2 wherein the first data and the second data include information which allows the first time and the second time to be identified.

5. A system according to claim 2 wherein the input sensor means is adapted to obtain said input signal at each of the first time and the second time.

6. A system according to claim 5 wherein the input sensor means includes second memory means for storing data representative of the input signal.

7. A system according to claim 6 wherein the processing centre is adapted to obtain the data from the second memory means.

8. A system according to claim 6 wherein the processing centre is adapted to make calculations using the first data and the data from the second memory means, for determining geological or geophysical parameters of the body.

9. A system according to claim 1 wherein the nodes are linked to the processing centre in sequence.

10. A system according to claim 9 wherein each node is connected to each adjacent node in series, and one of the nodes is connected in series to one adjacent node and to the processing centre.

11. A system according to claim 10 wherein each node is connected to each adjacent node by electrical cabling.

12. A system according to claim 10 wherein each node is connected to each adjacent node by radio frequency links.

13. A system according to claim 5 wherein the processing centre is adapted to provide control signals to the nodes and to the input sensor means for effecting the simultaneous obtaining of the output signals by the nodes, and the input signal by the input sensor means.

14. A system according to claim 13, the system being adapted for the control signals to actively compensate for transmission delays between the nodes.

15. A system according to claim 13, the system being adapted for the control signals to actively compensate for transmission delays between the processing centre and each adjacent node, and between the processing centre and the input sensor means.

16. A method for obtaining data from a geological body to which an actuating signal is applied at a predetermined location on the body, the method including the steps of:

obtaining, by way of an input sensor means, an input signal representative of a predetermined characteristic of the actuating signal;

obtaining, by means of each of a plurality of nodes at spaced-apart locations on the body, a respective first output signal representative of a predetermined characteristic of the body at a position which is at or adjacent to the surface of the body, and which corresponds to the location of the respective node;

storing, in first memory means disposed at each node, first data representative of the respective first output signal; and positioning a processing centre remote from the nodes for obtaining the first data from each first memory means.

17. A method according to claim 16 including the additional steps of:

obtaining the first output signals at a predetermined first time; and obtaining, by means of each node, a respective second output signal at a second predetermined time which is temporally spaced from said first time.

18. A method according to claim 17 including the step of storing second data, representative of the second output signals, in the first memory means at each node.

19. A method according to claim 18 including the step of identifying the first time and the second time using information included in the fist data and the second data.

20. A method according to claim 17 including the step of obtaining the input signal at each of the first time and the second time.

21. A method according to claim 17 including the step of providing the input sensor means with second memory means for storing data representative of the input signal.

22. A method according to claim 21 including the step of the processing centre obtaining the data from the second memory means.

23. A method according to claim 22 including the step of the processing centre making calculations using the first data and the data from the second memory means, for determining geological or geophysical parameters of the body.

24. A method according to claim 16 including the step of linking the nodes to the processing centre in sequence.

25. A method according to claim 16 including the steps of configuring each node to be connected to each adjacent node in series, and configuring one of the nodes to be connected in series to one adjacent node and the processing centre.

26. A method according to claim 16 including the step of connecting each node to each adjacent node with electrical cabling.

27. A method according to claim 16 including the steps of the processing centre providing control signals to the nodes and to the input sensor means to effect the simultaneous obtaining of the output signals by the nodes and the input signal by the input sensor means.

28. A method according to claim 27 including the step of the control signals actively compensating for transmission delays between the nodes.

29. A method according to claim 27 including the step of the control signals actively compensating for transmission delays between the processing centre and each adjacent node, and between the processing centre and the input sensor means.

* * * * *

UNITED STATES PATENT AND TRADEMARK OFFICE
CERTIFICATE OF CORRECTION

PATENT NO.    : 6,332,109 B1
DATED         : May 7, 2002
INVENTOR(S)   : Sheard et al.

It is certified that error appears in the above-identified patent and that said Letters Patent is hereby corrected as shown below:

The specification should be deleted and replaced with attached substitute specification.

Signed and Sealed this

Twentieth Day of July, 2004

JON W. DUDAS
*Acting Director of the United States Patent and Trademark Office*

BACKGROUND OF THE INVENTION

The present invention relates to a data acquisition system and in particular to a geological data acquisition system.

The invention has been developed primarily for geophysical surveys utilising controlled sources and natural sources for identifying metalliferous regions within a geological body, and will be described herein after with reference to that application. However, it will be appreciated that the invention is not limited to this particular field of use and is also applicable to other geological, geotechnical or environmental surveys.

The purpose of exploration geophysics is to produce images of sub-surface physical properties. The value of the images produced and manifested is dictated by the available spatial resolution and the property accuracy at all points. While this information can also be used to surmise or interpret chemistry and rock type, this is of secondary importance since such interpretations will be limited to the accuracy of the physical property image.

Owing to fundamental physical principles of linearity and reciprocity, the quality of the images produced by the available geophysical imaging systems is dictated by:

1. the multiplicity of source/receiver combinations or field/field response sites;
2. the combination of linearity and instantaneous dynamic range of the measurements (which are limited by a wide range of noise considerations some of which do not directly relate to system design);

- 2 -

3. the bandwidth in the measurements (also limited by various noise considerations in addition to basic system design); and 4. one or more indicators related to the degree of confidence in the accuracy of the images (estimates of sensitivity and error).

While such limitations are valid for all available prior art systems, there are additional problems compromising their ability to take useful measurements and therefore produce valuable images. More particularly, the prior art systems:

1. are custom made and configured for one particular type of electrical geophysical technique;

2. generally employ a single type of sensor; and 3. rely upon field operation techniques that were developed over twenty years ago.

These compromises have resulted in the proponents of the prior art systems trying to glean ever diminishing amounts of information from data sets of marginal quality. Moreover, although some improvements to equipment has been made, it is only incremental. The state of the art remains constrained to 30 year old designs and methodologies.

Some of these limitations have been recognised in the seismic exploration industry, where use is made of distributed acquisition systems and 3-D surveys. However, seismic surveys involve measuring motion or pressure only and the hardware techniques are not translatable to electrical geophysics. The latter employs a much wider range of sensors that are several orders of magnitude more demanding in terms of bandwidth, and also more demanding in terms of linearity and dynamic range.

- 3 -

BRIEF SUMMARY OF THE INVENTION

It is an object of the present invention, at least in the preferred embodiment, to overcome or ameliorate at least one of the deficiencies of the prior art.

According to a first aspect of the invention there is provided a data acquisition system for obtaining data from a geological body to which an actuating signal is applied at a predetermined location on the body, the system including:

an input sensor means for obtaining an input signal representative of a predetermined characteristic of the actuating signal;

a plurality of nodes for being located at spaced-apart locations on the body, each for simultaneously obtaining a respective first output signal from the body, the first output signal being induced by said actuating signal and being representative of a predetermined characteristic of the body at a position which is at or adjacent to the surface of the body and which corresponds to the location of the respective node;

first memory means disposed at each node for storing first data representative of the respective first output signal; and a processing centre remote from the nodes for obtaining the first data from each first memory means.

Preferably, the system is adapted for the first output signals to be obtained by the nodes at a predetermined first time and for each node to also obtain a respective second output signal at a predetermined second time which is temporally spaced from said first time. Preferably also, the first memory means at each node is adapted to store second data representative of the respective second output signal. Even more preferably, the first data and the second data include information which allows the first time and the second time to be identified.

- 4 -

Preferably also, the input sensor means is adapted to obtain said input signal at each of the first time and the second time. More preferably, the input sensor means includes second memory means for storing data representative of the input signal. More preferably, the processing centre is adapted to obtain the data from the second memory means. Even more preferably, the processing centre is adapted to make calculations using the first data and the data from the second memory means, for determining geological or geophysical parameters of the body.

In a preferred form the nodes are linked to the processing centre in sequence. More preferably, each node is connected to each adjacent node in series, and one of the nodes is connected in series to one adjacent node and to the processing centre. More preferably each node is connected to each adjacent node by electrical cabling. In other embodiments, however, alternative means such as optical cables or radio frequency or other wireless links are used.

Preferably, the processing centre is adapted to provide control signals to the nodes and to the input sensor means for effecting the simultaneous obtaining of the output signals by the nodes, and the input signal by the input sensor means. More preferably, the system is adapted for the control signals to actively compensate for transmission delays between the nodes. Even more preferably, the system is adapted for the control signals to actively compensate for transmission delays between the processing centre and each adjacent node, and between the processing centre and the input sensor means.

According to a second aspect of the invention there is a method for obtaining data from a geological body to which an actuating signal is applied at a predetermined location on the body, the method including the steps of:

obtaining, by way of an input sensor means, an input signal representative of a predetermined characteristic of the actuating signal;

- 5 - simultaneously obtaining, by means of each of a plurality of nodes at spaced-apart locations on the body, a respective first output signal representative of a predetermined characteristic of the body at a position which is at or adjacent to the surface of the body, and which corresponds to the location of the respective node;

storing, in first memory means disposed at each node, first data representative of the respective first output signal; and positioning a processing centre remote from the nodes for obtaining the first data from each first memory means.

Preferably, the method includes the additional steps of:

obtaining the first output signals at a predetermined first time; and obtaining, by means of each node, a respective second output signal at a second predetermined time which is temporally spaced from said first time.

Preferably also, the method includes the step of storing second data, representative of the second output signals, in the first memory means at each node. Even more preferably, the first data and the second data allow the first time and the second time to be identified.

Preferably also, the method includes the step of:

obtaining the input signal at each of the first time and the second time. More preferably, the method includes the step of providing the input sensor means with second memory means for storing data representative of the input signal. More preferably, the method includes the step of the processing centre obtaining the data from the second memory means. Even more preferably, the method includes the step of the processing centre making calculations using the first data and the data from the second memory means, for determining geological or geophysical parameters of the body.

- 6 -

In a preferred form the nodes are linked to the processing centre in sequence. More preferably, the method includes the step of configuring each node to be connected to each adjacent node in series, and configuring one of the nodes to be connected in series to one adjacent node and to the processing centre. More preferably the method includes the step of connecting each node to each adjacent node with electrical cabling.

Preferably, the method includes the step of the processing centre providing control signals to the nodes and to the input sensor means to effect the simultaneous obtaining of the output signals by the nodes and the input signal by the input sensor means. More preferably, the control signals actively compensate for transmission delays between the nodes. Even more preferably, the control signals actively compensate for transmission delays between the processing centre and each adjacent node and between the processing centre and the input sensor means.

BRIEF DESCRIPTION OF THE SEVERAL VIEWS OF THE DRAWINGS

A preferred embodiment of the invention will now be described, by way of example only, with reference to the accompanying drawings in which.

- 7 -

Figure 1:
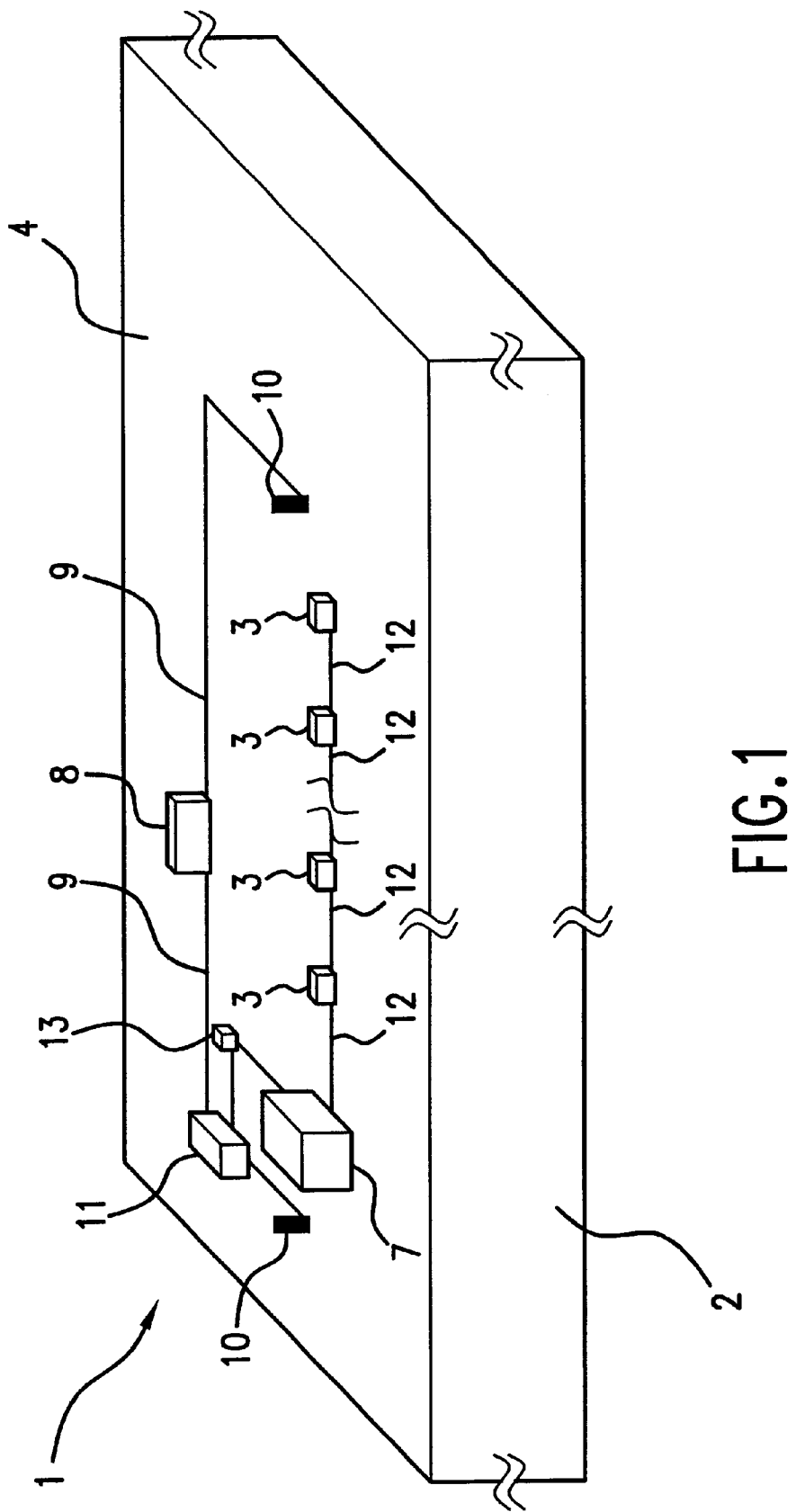
Figure 1 is a schematic representation of a data acquisition system according to the invention.
Figure 4:
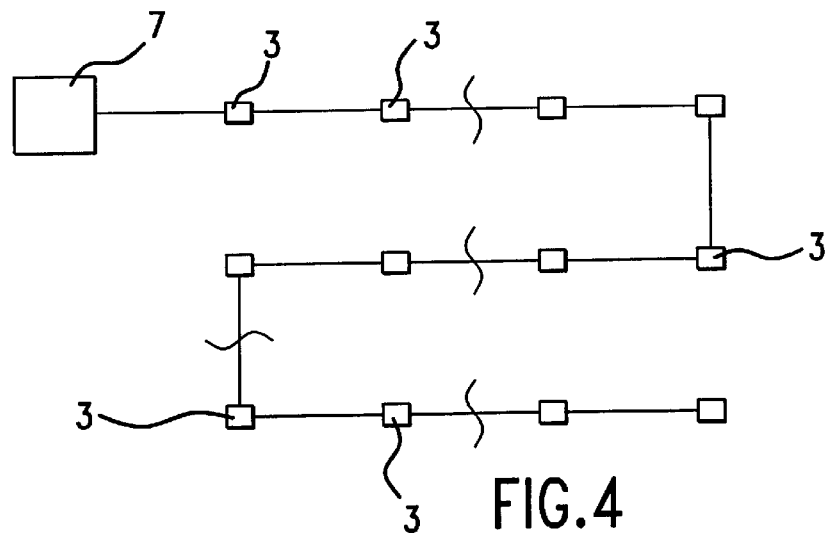
Figure 4 is a schematic plan view of an alternative node layout.
Figure 9:
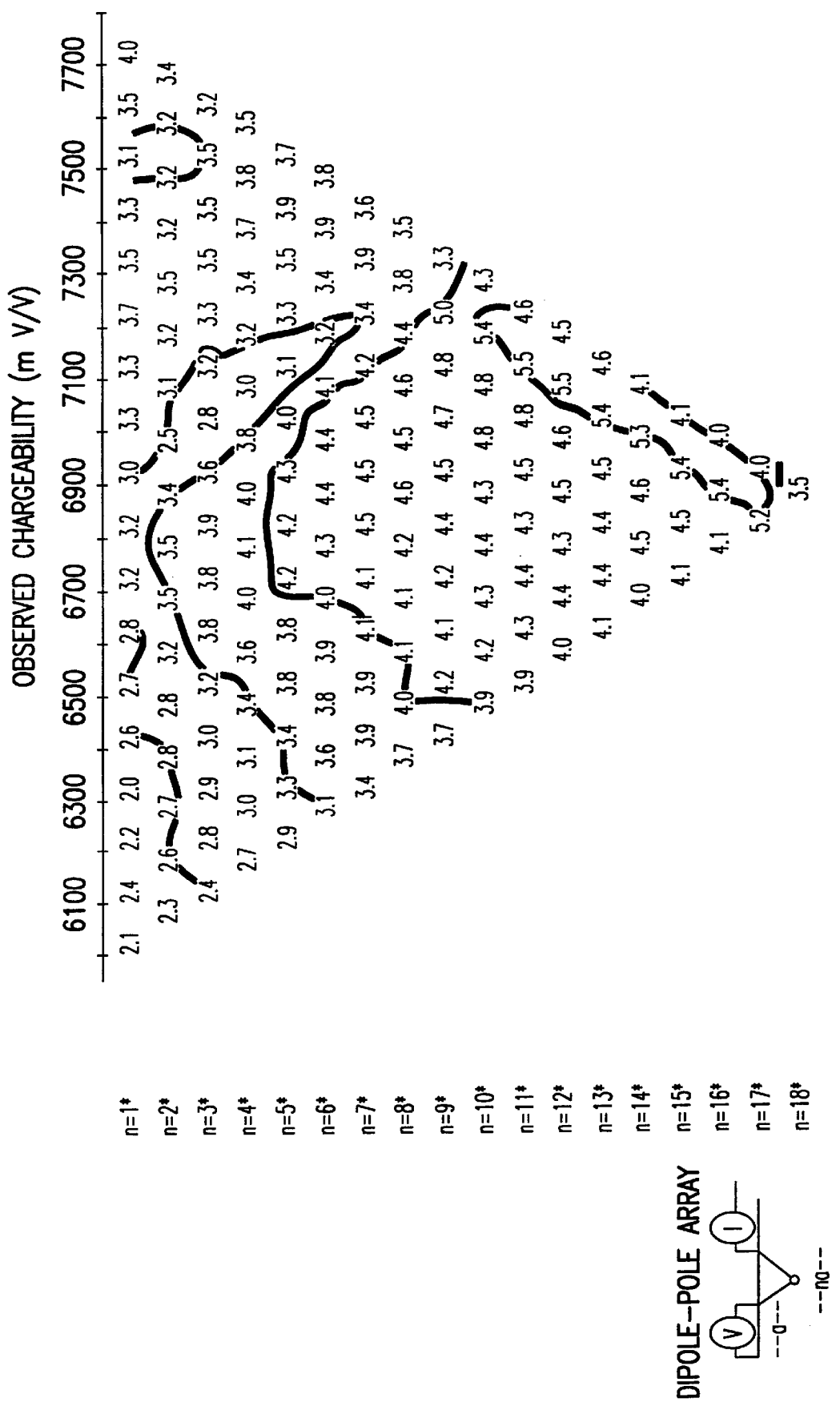
Figure 10:
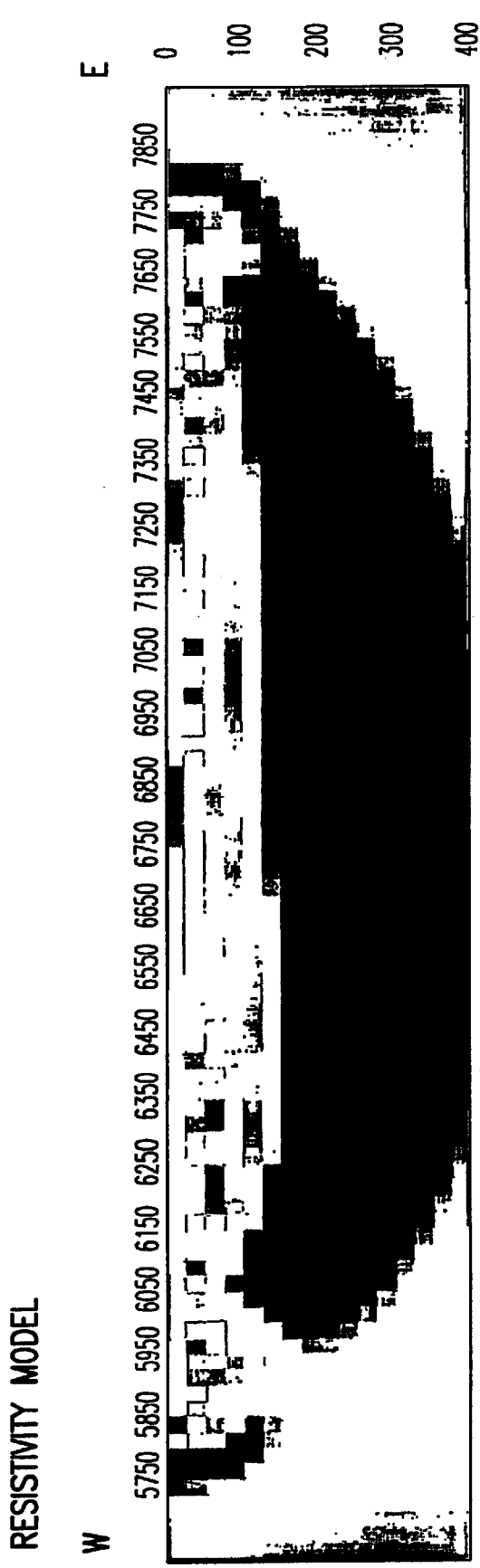
Figure 11:
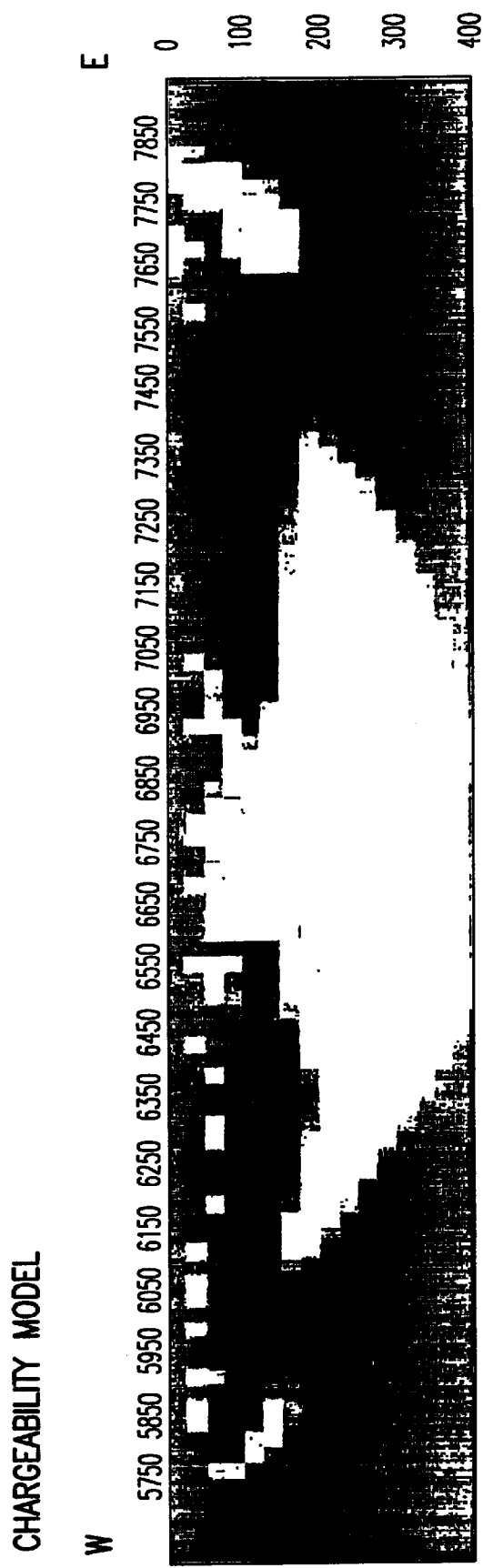
Figure 12:
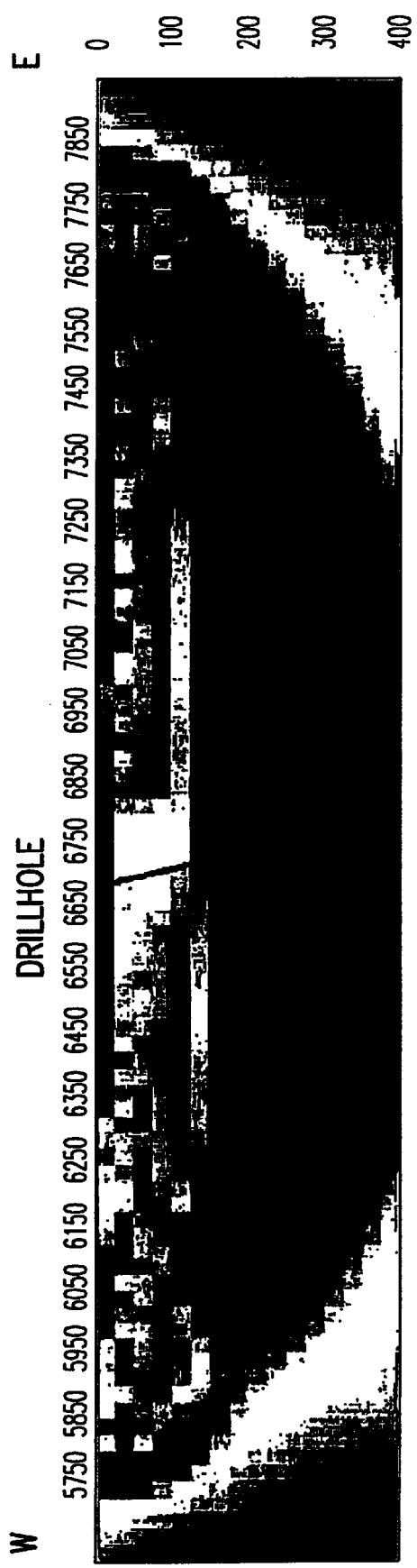
Figure 13:
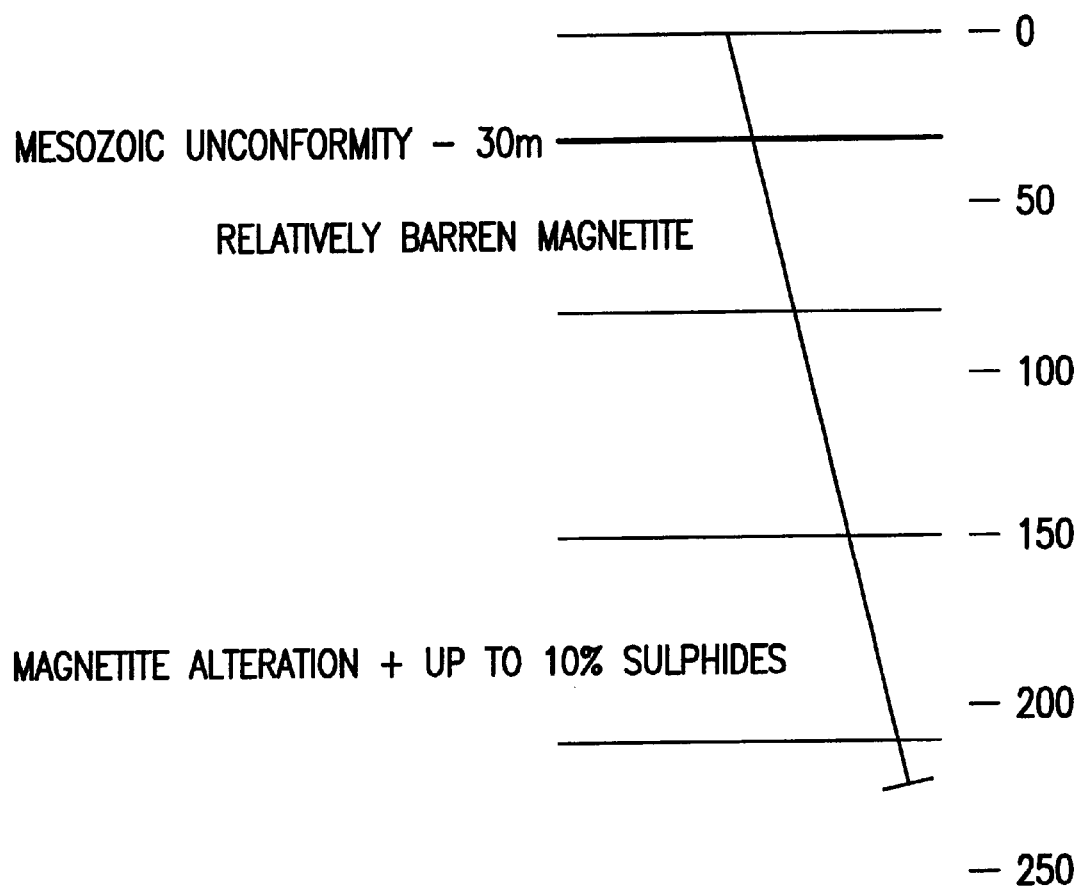

Figure 8 illustrates a section for a body of earth showing resistivity values against a pseudo depth estimation which is known commonly as a resistivity pseudo section, the section being obtained using the system of Figure 1;

Figure 9 illustrates a section for a body of earth showing chargeability values against a pseudo depth estimation which is known commonly as a chargeability pseudo section, the section being obtained using the system of Figure 1;

Figure 10 is a chart of the resistivity of a body of earth showing depth estimation that has been calculated with the system of Figure 1 configured in the layout of Figure 4;

Figure 11 is a chart of the chargeability of a body of earth showing depth estimation that has been calculated with the system of Figure 1 configured in the layout of Figure 4;

Figure 12 is a chart of combined resistivity and chargeability model for the body under investigation showing depth estimation; and Figure 13 is a cross sectional view of the drilling results conducted as indicated in Figure 11.

DETAILED DESRIPTION OF THE INVENTION

Referring to Figure 1 there is illustrated a geological data acquisition system 1 for obtaining data from a geological body 2. System 1 includes a plurality of like nodes 3 for simultaneously obtaining respective first measurement signals representative of predetermined characteristics of body 2 at a corresponding plurality of equally spaced apart locations adjacent to the top surface 4 of body 2. First memory means 5 (not shown) are disposed at each node 3 for selectively storing first data representative of the first measurement signals. A processing centre 7 is remote from nodes 3 and selectively obtains the first data from each memory means.

- 8 -

A current source 8 provides body 2 with a time varying actuating current via conductors 9 and spaced apart electrodes 10. The electrodes are embedded in body 2 and extend upwardly form surface 4. An input sensor means in the form of a digital current meter 11 obtains an input signal representative of the time varying current flowing through conductors 9. This data signal is provided to a node 13 and subsequently provided to centre 7, when requested. In this embodiment, node 13 is the same as nodes 3, with the exception that it is responsive to the excitation signal rather than the measured effects of that signal on body 2.

In other embodiments the input sensor obtains another characteristics of the actuating signal provided by source 8. For example, some embodiments, that characteristic is the voltage at the sensor, while in other embodiments the characteristic is the magnetic field at the sensor induced by the current source. In still further embodiments the input means obtains more than one characteristic.

Meter 11 includes second memory (not shown) for storing data representative of the input signal, which will be referred to as second data. Preferably, the second data is obtained at predetermined times which correspond to the times that nodes 3 obtain the first measurement signals. Moreover, meter 11 is responsive to a control signal from centre 7 for downloading the second data from the second memory to centre 7.

System 1 is based upon single channel distributed acquisition nodes that collect between 19 and 24 bits per sample, depending upon sampling frequency, of non-aliased linear data with a band width in the range of 0 to 20 kHz. This data is collected in memory means 5 and, upon request, relayed to centre 7. Preferably, centre 7 is transportable and more preferably mounted on a recording vehicle.

In other embodiments a different number of bits per sample are obtained.

- 9 -

Adjacent nodes 3 are serially connected by local area network (LAN) cables 12. In this embodiment cable 12 is Category 5 cable. In other embodiments cables 12 are substituted by optical cables or radio frequency or other wireless links.

Each node 3 is accurately synchronised and the data stored in each means 5 is streamed into centre 7 and recorded at the end of each event. Centre 7 includes acquisition software for interrogation of all the incoming data from each node and any other sensors used, such as meter 11. Centre 7 includes display means (not shown) and, if desired, the raw data from the memory means is displayed as it arrives. In this embodiment the data is processed on site and field plots produced. In other embodiment, however, the data is collected and processed remotely.

The serial connection between adjacent nodes 3 and centre 7 will be termed a distributed system and is advantageous as it avoids a multiplicity of cables attached between various components. That is, only one cable link is required to extend from centre 7 to connect it to all the nodes. Accordingly, this configuration offers substantially better noise performance while also allowing greater scope for expandability of nodes. The latter is limited only by logistics and available computer power.

It will be appreciated by those skilled in the art that cable 12 is preferably a multi-core or multi-conductor cable.

Moreover, as meter 11 is obtaining data of the quantum and timing of the input signal, it is no longer critical to utilise a high accuracy current source to generate the actuation signal. That is, centre 7, in embodiments where it performs the data processing, produces resultant data from theoretical clean waveforms used in interpretation packages. It also allows a simulation of the effect of different input waveforms on the geological body.

- 10 -

Noise problems are further reduced as the data from each channel is collected simultaneously and, accordingly, considerable noise cancellation occurs. The time series data allows simple signal processing procedures to remove cultural noise, which when combined with selective stacking routines and other remote reference noise
5   cancellation schemes produces very high quality data. Considerable area or line kilometres of quality data can be captured rapidly.

The first and second data are continuously streamed from the nodes to centre 7. For nodes other than that node immediately adjacent to centre 7, the respective first data is sequentially progressed via intermediate nodes until it reaches centre 7. Due to the
10  buffer offered by memory 5 the first data is transmitted when no other signal transmission is occurring. Accordingly, the first data is transferred either during or after acquisition of additional data. The particular value of continuous streamed data is the ease of re-processing at later times.

This embodiment is adapted to controlled source surveys in that system 1
15  accurately monitors the input current. This current data is then used to deconvolve the first data and allow the calculation of desired geological or geophysical parameters of body 2 via interpretation techniques.

Nodes 3 each include a single channel sensor unit, while centre 7 has at least two input channels. One of those two channels links to a first of the plurality of serially
20  connected nodes 3, while the other is connected to another serially connected node. In some cases the other channel is connected to another remote array by a suitable radio frequency link. The use of single channel units within nodes 3 provides modularity, portability, small size and low weight.

- 11 -

Each node 3 includes of a power supply board, a communication board and a data logging board containing memory. In this embodiment the memory has a capacity of 2 megabytes. In other embodiments different capacities are utilised.

In this embodiment nodes 3 are sensitive to an induced magnetic or electrical signal arising from the varying current waveform that is provided by source 8 and/or natural fields. That is, nodes 3 include respective magnetometers. However, in other embodiments use is made of other magnetic to voltage transducers. For example a coiled conductor and/or a grounded electrode. That is, system 1 is not limited to provided a single type of geophysical data and is selectively configured, as circumstances dictate.

Preferably, nodes 3 include an internal battery source. However, in alternative embodiments power is supplied via external batteries or solar power.

To maintain accurate synchronisation, system 1 includes timing software at centre 7. This software involves centre 7 sending a pulse through the serially connected nodes, each of which return the pulse following a predetermined delay after receipt. The return time from each box is measured and the travel time for the pulse is calculated. This provides an accuracy of synchronisation so that the data from the nodes is obtained simultaneously, which allows very accurate phase calculations of the signals received by the sensors.

Centre 7 sequentially interrogates each node to check sensor impedances and noise. The resultant data is streamed to centre 7 and recorded on two separate 2 gigabyte drives. In other systems use is made of data storage having other forms and sizes.

As will be appreciated by the teaching herein, system 1 is modular and produces high quality data from array style measurements.

- 12 -

Nodes 3 can use any sensor type and, with suitable software, produce detailed interpretative products with increased resolution and better depth penetration than the known prior art.

Reference is made to Figures 4, 5, 6 and 7 which illustrate respective alternative layouts for nodes 3 which include corresponding features denoted by corresponding reference numerals. More particularly, the Figure 4 layout includes a plurality of daisy chained nodes 3 which are arranged in parallel transversely spaced apart linear arrays which extend longitudinally across surface 4. The number of linear arrays and the number of nodes in each array is determined by the extent of the survey required. Preferably, each array includes the same number of nodes. More preferably, the nodes in adjacent arrays are aligned transversely. In other embodiments, however, the corresponding nodes in adjacent arrays are uniformly longitudinally offset from each other.

In this layout, all the data collected at the individual nodes has to be transmitted to centre 7. Accordingly, the delay in relaying the necessary information to centre 7 will increase greater than proportionally with the number of nodes utilised.

Figure 5:
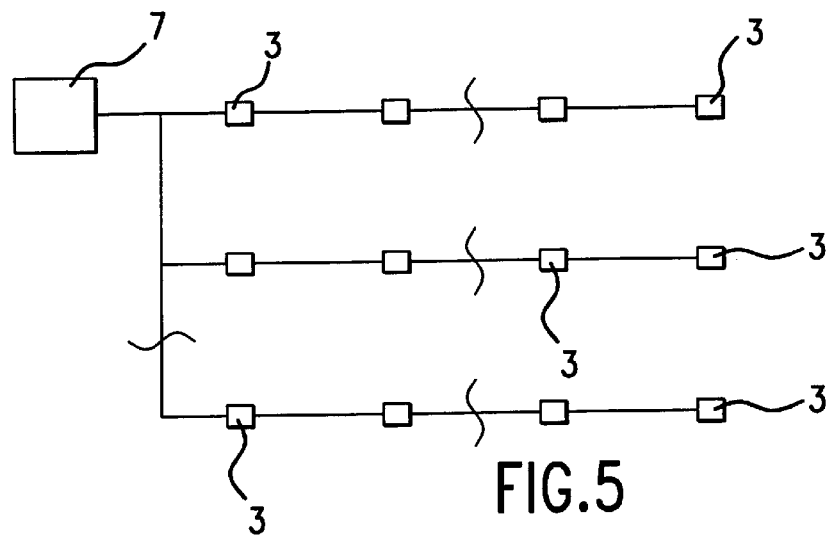
Figure 5 is a schematic plan view of a further alternative node layout.

The layout of Figure 5 is similar to that of Figure 4 with the exception being that the delays in transmitting the necessary information to centre 7 is decreased. That is, use is made of a plurality of longitudinally extending transversely spaced apart linear arrays of nodes 3 that are collectively joined to centre 7. In this layout, the transmission delay will linearly increase with the number of arrays. However, the delays will increase at a rate greater than proportionally with the number of nodes in each array.

Figure 6:
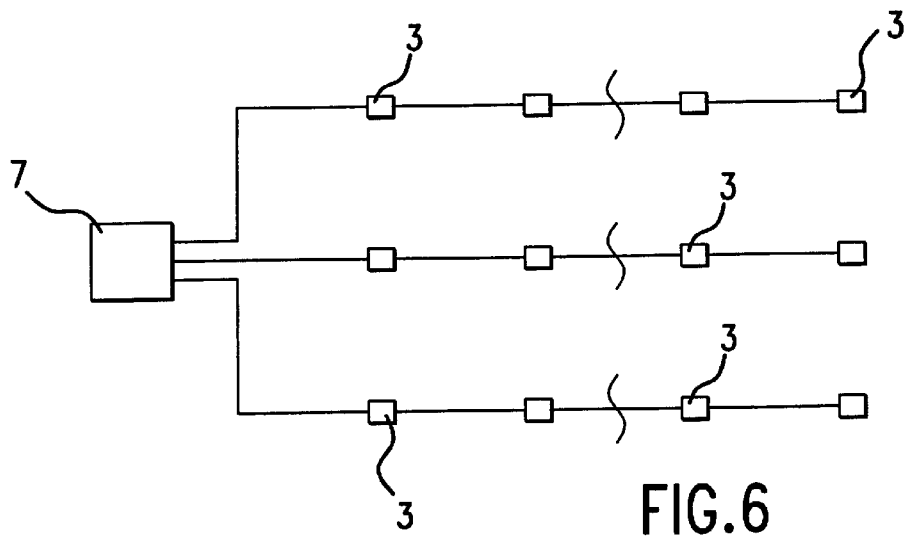
Figure 6 is a schematic plan view of another alternative node layout.

The layout of Figure 6 includes a centre 7 having a plurality of channels for interacting with respective transversely spaced apart longitudinally extending linear arrays of node 3. Although three arrays are illustrated, in other embodiments use is made of a different number of arrays. As there is a separate channel for each array, the delay in relaying information to centre 7 is independent of the number of arrays.

Figure 7:
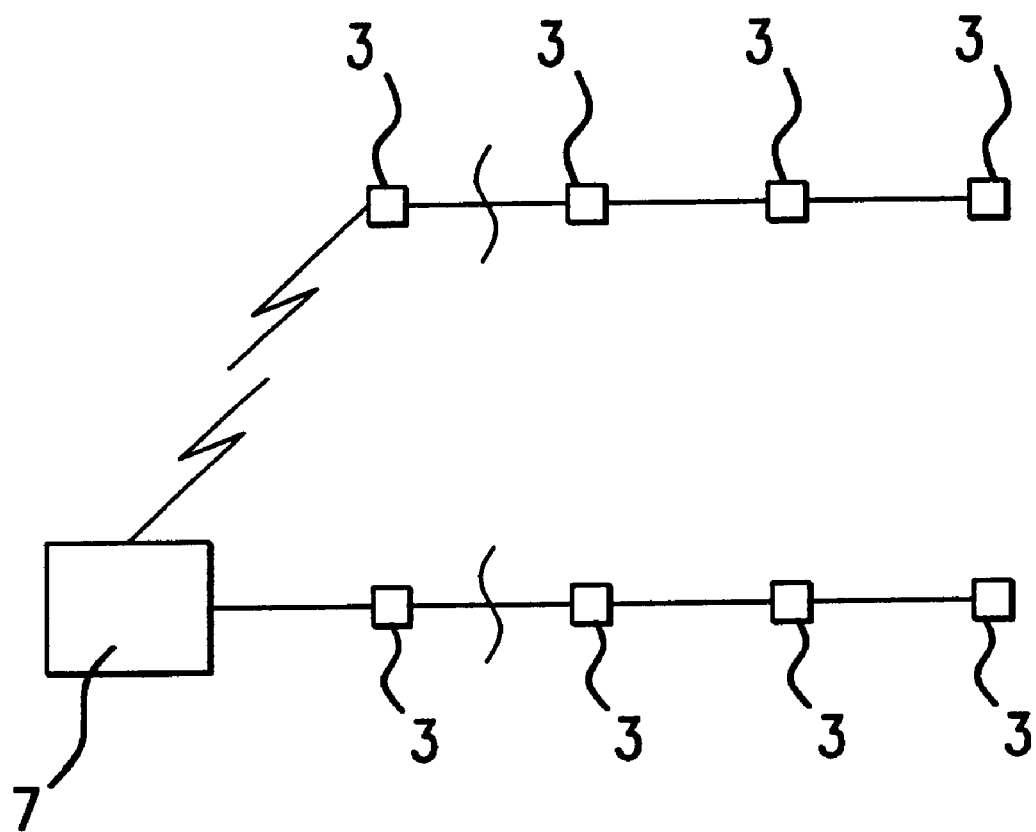
Figure 7 is a schematic plan view of another node layout.

The layout of Figure 7 includes the layout of Figure 1 in that there is a linear array of daisy chained nodes 3 having one such node linked to centre 7 by a Category 5 cable. In addition, a second array of daisy chained nodes 3 is spaced apart from and co-extensive with the first array. This second array includes a node which is linked to centre 7 for wireless communication of data.

Figure 3:
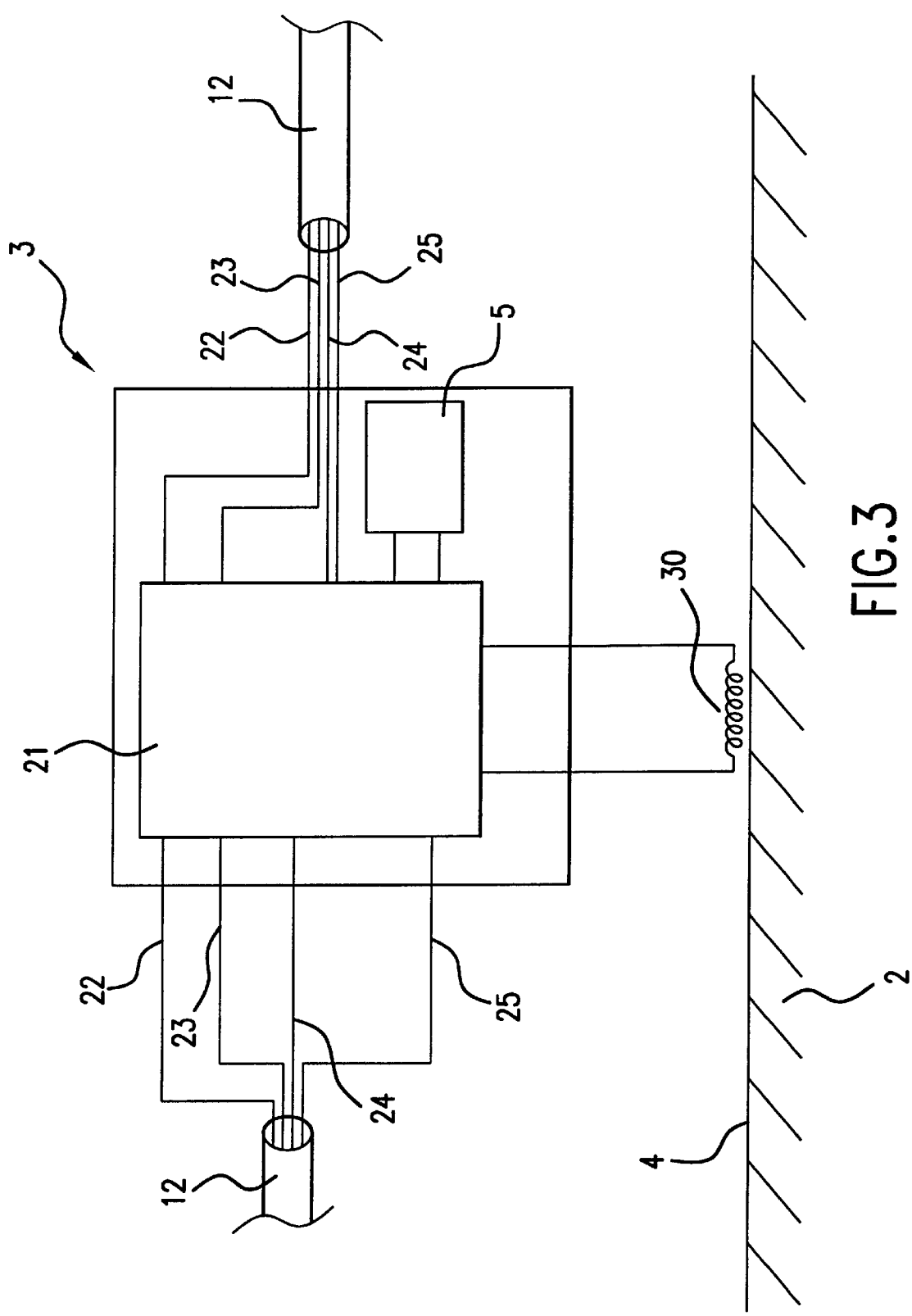
Figure 3 is a schematic view of a node that measures a magnetic field strength.

Reference is now made to Figure 3 which illustrates one of the nodes 3 used in system 1. More particularly, the node includes a central processor 21 which receives and transmits signals through the two adjoining cables 12. These cables connect node 3 to adjacent nodes or centre 7 if node 3 is adjacent to centre 7. As will be appreciated by those skilled in the art, if node 3 is the last node in an array, it will only be connected to one other node. Processor 21 is responsive to internal software and external commands from centre 7 for performing the necessary data collection and transmission functions. That software and the data, once collected, are selectively stored in and accessed from memory 5.

Each cable 12 includes four separate conductors 22, 23, 24 and 25. Conductor 22 is the command and timing line which carries the communications between adjacent nodes. Each node and centre 7 will have a predetermined unique address so that an command packets received by a particular node will be either identified as being for that node, and processed accordingly, or otherwise passed to the next node.

Conductor 23 is a data line that carries all the data packets between the nodes and to centre 7.

Conductor 24 is a communication line for auxiliary functions such as a GPS signal or the like.

- 14 -

Conductor 25 is an earth return line which allows node 3 to conduct its measurement function. More particularly, and as shown in the drawing, node 3 includes an earth pin 26 which is linked to processor 21. This pin is electrically connected, via processor 21, to conductor 25 of the cable 12 that extends to the right of node 3 to earth that conductor. A similar arrangement is effected at each node and, consequently, the remote end of the conductor 25 extending to the left of node 3 is also earthed. Processor 21 then samples the voltage between its respective connections with the left extending conductor 25 and the earth pin 26. The same operation occurs at the other nodes in the array. Moreover, the separate samples at the different nodes are synchronised with the sampling of the input signal provided by source 8.

That is, nodes 3 allow centre 7 to determine the voltage at the nodes and the voltage differential between the nodes. Accordingly, an extremely large number of dipole pairs are formed, in that each node forms a dipole with every other node being used in the survey. As the position of the nodes is known, either from pre-placement or through the use of GPS sensors disposed at the respective nodes, it is possible to also determine the distance between the nodes. This provides some redundancy in the information which, in turn, allows error checking. Accordingly, the results of the survey are less susceptible to spurious errors. This robustness is also facilitated through the simultaneous sampling of both the input current, or other input signal, and the output signals which, in this case, is the voltage between adjacent nodes. Such simultaneous sampling allows centre 7 or a corresponding processing means to treat body 2 as a "black box" and to provide a transfer function defining selected properties of that body as indicated by the measured signals. This issue is addressed further, below.

In other words, because both the input signal to the geological body and the output signals from the body are sampled simultaneously, this allows the results produced – that is, the output induced by a particular input – to be compared with the thoeretical outputs yielded by predermined mathematical transfer functions when these are assumed to have, as their inputs, variables corresponding to the actual input to the actual body.

By comparing the output signal from an actual geological body with the theoretical output from such a transfer function, the actual body can be identified as being of a particular type as represented by the relevant transfer function, even without knowing the actual composition and characteristics of the actual body – hence its being considered as a "black box".

This ability to compare actual bodies with mathematical functions arises from the ability to accurately sample and analyse the input signal simultaneously with sampling and analysing the output signals. Accordingly, this feature of the present invention constitutes a major advantage over the prior art systems.

The accuracy of the samples is preferably eight bit, although other embodiments make use of different sample sizes. It is also preferred that the sample rate is high to cover a wide range of frequencies. It is also preferred that the DC voltage is detected.

Figure 2:
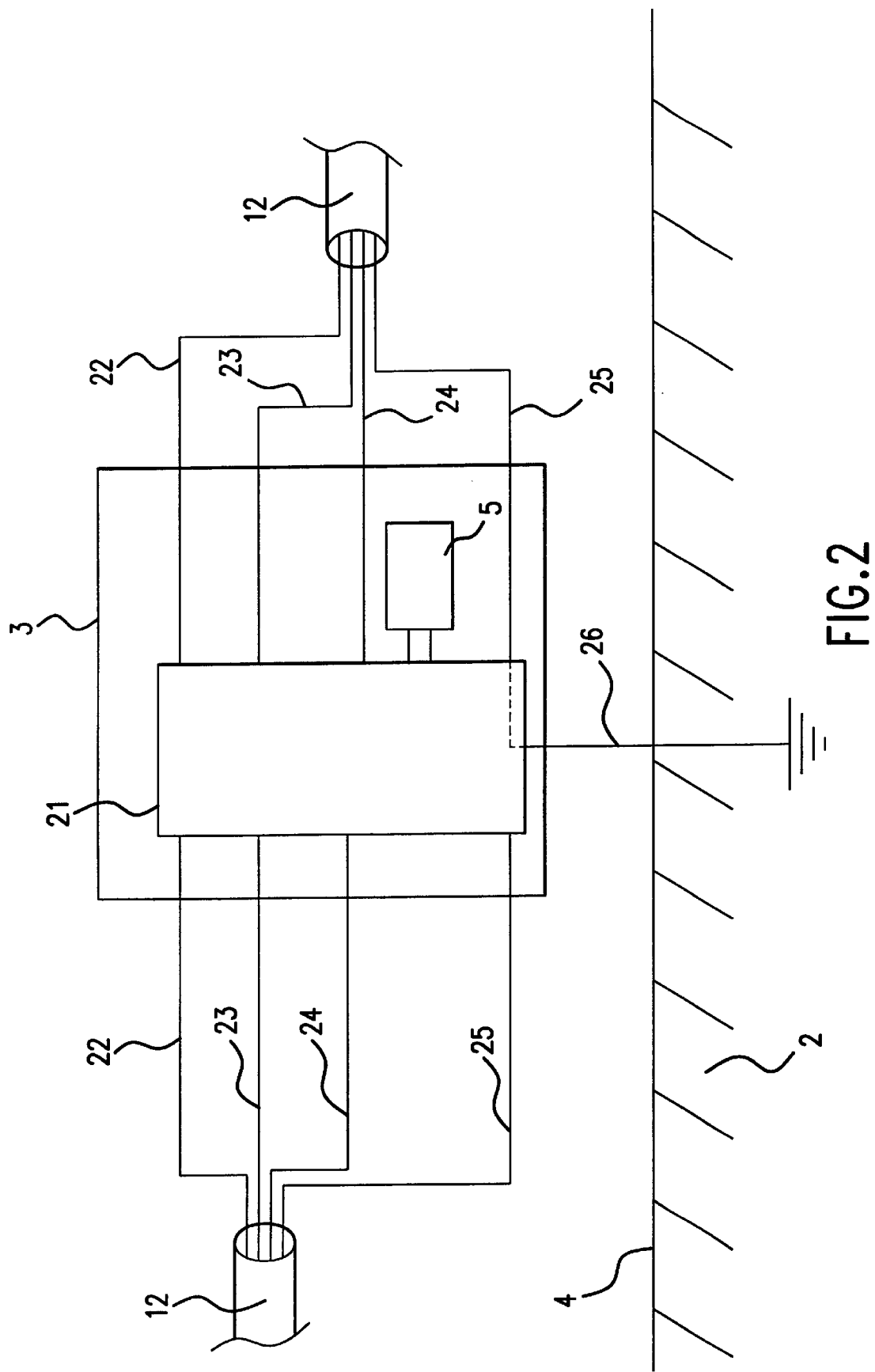
Figure 2 is a schematic view of a nodes that measures a voltage.

In other embodiments, nodes 3 are configured to interact with sensors other than a voltage sensor such as that used in the Figure 2 embodiment. For example, an alternative sensor arrangement is illustrated in Figure 3 where corresponding features are denoted by corresponding reference numerals. That is, processor 21 is responsive to the voltage generated across a coil 30. This voltage is indicative of the magnetic field at node 3.

Nodes 3 are particularly suited to the gathering of non-seismic data. Moreover, the nodes are easy to deploy about surface 4 and easily regathered after a survey has been conducted.

- 16 -

The use of single cables extending between adjacent nodes greatly reduces the amount of cabling required. This also facilitates deployment and regathering of the nodes by reducing the required labour input and logistics involved.

System 1 has been trialed and sample results are shown in Figures 8, 9, 10 and 11 with a layout in accordance with Figure 4. More particularly, the results were produced using an IP section and indicated a good target at 150 metres. This target was drilled and the desired metalliferous ore found. At this site there is a thick top layer (overburden) which is electrically conductive which makes it impossible for conventional systems to achieve the necessary depth penetration to indicate a target.

Figure 8 is a pseudo section of the observed apparent resistivity of the body of earth under consideration. The abscissa is indicative of the relative location on the body and is expressed in terms of metres, while the ordinates are expressed in terms of the separation between the nodes from which the voltage reading was derived. As illustrated, system 1 accommodates a large number of nodes and as such, good depth penetration is achieved.

The calculated resistivity at the various points is expressed in Figure 8 in Ohm.m and distinct lines of equi-resistivity are shown.

Figure 9 is a corresponding plot for the observed chargeability of the same body of earth. This chart is generated by measuring the decay of the surface voltage following a fall in the input current provided by source 8.

The charts provided in Figure 8 and Figure 9 are interactively processed to provide the charts shown in Figure 10 and Figure 11 respectively. That is, the Figures illustrate the resistivity and chargeability of the body based upon the data collected at the nodes.

Figure 10 allows the estimation of the depth of the resistive material in body 2. In this case, that resistive material is an oxidised deposit.

- 17 -

Figure 11 shows that body 2 includes a discrete sub-surface deposit of high chargeability. However, this deposit is disposed below a surface deposit of relatively high conductivity. Prior art systems would not have been able to accurately detect the sub-surface deposit using conventional arrays due to the presence of the conductive surface deposit. Even if such prior systems could be adapted to provide such results, the time and expense involved would be prohibitive.

Figure 12 illustrates a combined resistivity and chargeability model for body 2 that has been calculated form the data obtained from nodes 3. Additionally, Figure 13 illustrates the drilling results indicated in Figure 12.

In some embodiments, a number of surveys are conducted on the body and the results of those separate surveys are correlated to provide the ultimate results.

System 1 is applicable to the acquisition of controlled source electromagnetic data, induced polarisation data including spectral information, magnetometric induced polarisation, controlled source magnetotelluric data, magnetotelluric data and standard electromagnetic data. The system is also applicable to the acquisition of other data sets such as seismic data. It will also be appreciated that system allows processing both in the time and frequency domain.

As both the input signal and the output signals are measured accurately and simultaneously system 1 is able to provide useful survey results for bodies of earth that would be unsurveyable by prior art methods. Moreover, system 1 makes use of high bandwidth measurement from many nodes which allows the extraction of significantly more data than prior art systems and the calculation of more accurate and meaningful results.

- 18 -

System 1 is also applicable to the mapping of acid leakage in mines. That is, the water carrying such acid is more conductive than the surrounding earth and will be detectable by system 1.

In some embodiments nodes 3 communicate with each other to share or exchange information. In further embodiments multichannel nodes are used.

System 1 is a distributed acquisition system which makes use of analog-to-digital conversion at nodes 3. This provides a variety of advantages, such as:

1. a broad measurement bandwidth, in this case from DC to 22 kHz;

2. a large channel capacity, in this case 100 channels, although in other embodiments more channels are used;

3. a virtually perfectly matched system distortion for all channels; and 4. an unlimited separation between recording location at centre 7 and the measurement positions at respective nodes 3.

In this preferred embodiment use is made of Sigma-Delta analog-to-digital conversion technology which provides:

1. guaranteed un-aliased, uniformly sampled or equally spaced data;

2. maximum bandwidth per sampling rate; and 3. an instantaneous dynamic range and linearity of about 22 bit, or 132 dB, equivalent at 100 samples per second. System 1 is, however, operable over a range of sample rates. By way of example, when operating at 48,000 samples per second the equivalent linearity is about 16 bit or 96 dB.

In other embodiments use is made of instantaneous gain control which, while affording good instantaneous dynamic range, does not also afford the same linearity over that range.

- 19 -

All the channels of system 1 include a high input impedance in the order of 10 megohms. Preferably, this impedance is frequency independent over the desired operating range to assist in maintaining relatively low system noise. Moreover, the high input impedance, in combination with the large instantaneous dynamic range and linearity, allows the use of a huge range of input devices. For example, all known electrical geophysical methods sensors are accommodated by system 1. This flexibility and the large channel capacity make system 1 applicable to:

1. all known or documented electrical geophysics techniques such as controlled source induction methods, controlled source galvanic methods, natural field methods including magnetotellurics, tellurics, and self-potential;

2. alternative or hybrid methods which have either seldom or never been practiced before. For example, when applied to standard induced polarisation grounded line excitations, system 1 is, in some embodiments, configured to measure and calculate E-field/H-field responses in addition or as opposed to classical E-field/current responses.

3. procedures and methodology using unconventional sensors such as metal potential electrodes for induced polarisation surveys, which speeds up and reduces the materials costs of surveys; and 4. a range of non-electrical geophysics applications including seismic, piezoelectric, large channel capacity industrial and mining sensor monitoring. An example of the last mentioned category includes measurements such as rock strain and vibration, machinery vibration, temperature, gas content, humidity, pressure, and the like.

- 20 -

System 1 avoids a number of prior art limitations by making use of the frequency independent high input impedance referred to above. Most known electrical geophysical systems have characteristics that lead to:

1. phase distortion or polarisation. In the case of induced polarisation surveys this is catastrophic and effectively corrupts any data.
2. non-linearity owing to current flow across metal potential electrodes; and
3. sensor dependent system distortion. That is, different system distortion for sensors with different impedances.

In controlled source applications such as that used in the present embodiment, the practice is to measure all excitations with the same linearity/accuracy as all other response channels. This plays an important role in allowing:

1. an accurate deconvolution of the excitations;
2. response domain and waveform transformations;
3. easing expense and other constraints on both the excitation transmitter and the electronics array conversion;
4. frequency domain telluric cancellation; and
5. the operation of multiple excitations simultaneously.

System 1 also accommodates the retention of all raw data. In this embodiment that data is stored at centre 7 as time series samples. In other embodiments alternative storage methodologies are followed. In any event, the retention of this information allows:

1. post-processing with improved algorithms tailored to changing noise conditions;
2. ease of continued testing and development of improved processing algorithms;
3. the ability to observe and diagnose problems or noise sources; and

- 21 -

4. the ability to glean startup transient response information.

As all the uniformly spaced data samples are stored, a scheme of acquiring data in limited bandwidth segments is utilised. Such a scheme is essential to keep data volumes at an acceptable level. This becomes particularly relevant in circumstances where a large number of channels are employed.

Large system channel capacity leads to several important advantages beyond the obvious ones of source/receiver multiplicity and economies of scale. Some of these advantages are:

1. sufficient flexibility is provided in sensory input that in some embodiments use is made of the overlap in different geophysical or geological exploration methods. That is, joint or simultaneous surveys are performed making use of common sensor types and array layout. For example, both magnetotellurics and induced polarisation surveys utilise a large number grounded line dipoles. Once a crew have prepared an induced polarisation survey layout, it takes very little additional effort and time to use system 1 to collect magnetotellurics data. Hence, induced polarisation surveys can be run that also collect magnetotellurics data for negligible additional cost;

2. allowable reading times and data quality that are greatly increased in array measurements. For example consider system 1 in the form of a gradient array with 10 lines of 20 dipoles each. System 1 is configured to read all channels at once or otherwise in two setups. Based upon a normal operating environment, the total reading time will be 4 hours or 8 hours respectively. The largest known commercially available system, however, only offers a 16 channel capacity. Accordingly, with such a system, assuming 8 separate excitations or

- 22 - bipoles were required and the reading time is 30 minutes, would involve a total reading time for a single receiver 16 channel system of 50 hours;

3. does not necessitate the use of multiple receivers for large arrays. That is, one approach to the limited channel capacity of the prior art systems is to utilise multiple receivers simultaneously. Although such arrangements are known in commercial systems, it is unusual as it results in a higher cost per channel for the survey due to the requirement for additional operators; and 4. for controlled source surveys, reading along multiple lines provides information regarding current flow and eddy current dispersion in directions perpendicular to the line, thereby greatly increasing the information content.

System 1 has been developed to make use of a number of principles of the physics of the earth electrical properties. These include the principles of linearity, superposition, and reciprocity. These allow system 1 to provide some extraordinary possibilities in manipulating and combining sensor information. Consider the following general scenario of system 1 utilising $n$ receiving dipoles or bipoles. For the purpose of the illustration $n$ will be set at 100. These dipoles or bipoles are made up of $n$-2 spaced apart electrodes between which the voltages are measured. It is possible from this to construct $[n-1]!$ ($9 \times 10^{155}$) different two electrode dipoles from the measured data set. In this scenario the number of truly independent pieces of information is still $n$, although additional information can in fact be gleaned out of such manipulations. However, as would now be apparent to those skilled in the art from the teaching herein and in consideration of excitation transformations and the resulting multiplicity of source receiver combinations, the advantageous nature of system 1 as compared with known systems becomes even clearer.

- 23 -

The use of an array as described to above will be referred to generally as an "array transformation". Although system 1 provides such transformations it is not limited in this way. That is, system 1 also is configured to provide a variety of other manipulations and calculations such as:

1. combining multiple transmitter dipoles and/or bipoles to form other arrays, be they either classical or non-classical arrays, in grounded line methods, this includes:

a) measuring both pole-dipole and dipole-pole information without having a back-current present for every measurement;

b) converting pole-dipole and dipole-pole information to dipole-dipole information;

c) forming multiple electrode current focusing excitations to either force more current through conductive cover or maximise current density at a position of interest in the sub-surface. This current is either physically provided or mathematically provided; and d) forming the equivalent of a non-grounded loop induction source from grounded line sources that share electrodes.

combining multiple receiving sensors to form other useful sensor equivalents such as:

a) forming long bipoles as the sum of all dipoles along a line to serve as a noise reference in telluric cancellation;

b) forming long bipoles as the sum of all dipoles along a line to serve as cross-reference in natural field surveys as opposed to using inconvenient remote magnetic field sensors;

- 24 - c)    forming paths to electrode combinations on multiple lines read simultaneously to provide the equivalent, in terms of information content, of TE oriented dipoles (parallel to strike) at every electrode position;

d)    combining a multiplicity of lower quality, less expensive magnetic field sensors, such as flux-gates or magnetoresistive sensors, to form the equivalent, in terms of sensor noise, of more widely spaced expensive sensors while still allowing high spatial resolution measurement at higher signal levels. A particular example of the latter includes high frequency measurements in controlled source induction surveys; and e)    combining a multiplicity of lower quality, less expensive sensors such as flux-gates, magnetoresistive magnetometers or aluminium electrodes. Reliance is then placed upon the physical principles of spatial coherence of in ground signals to reduce the effective individual sensor noise levels;

3.    run multiple transmitters simultaneously at different frequencies and with special procedures and advanced signal processing segregate the individual output/input components. This allows system 1 to effectively double productivity;

4.    use grounded line excitation arrays with more than two electrodes but a sufficient number of current monitors to allow segregating the individual output/input responses for the various dipole/bipole source equivalents;

5.    form gradient-type measurements in conditions where noise, whether it be vibration, cultural, telluric or the like, in adjacent sensor measurements are roughly the same but the signal components are different;

6.    employ seismic and tomographic style imaging techniques to provide alternative, and in many cases faster inversions as opposed to iterative forward modeling and optimisation.

- 25 -

The following is a brief description to further highlight and illustrate some significant features and aspects concerning the signal processing utilised by system 1.

In terms of hierarchy, the ability to implement advanced signal processing depends on many hardware specifications collectively. Having un-aliased, uniformly sampled data affords greatly improved flexibility and power in realm of signal processing. This is especially true in the case of applying technologies and algorithms developed outside the electrical geophysics industry. This plays an important role in the:

1. deconvolution of excitation(s);
2. domain and waveform transformations;
3. array conversion;
4. noise cancellation;
5. pushing effective linearity/resolution past the limits of lease significant bit resolution;
6. easing expense and constraints on transmitter (excitation) design and electronics; and
7. the operation of multiple excitations simultaneously.

Controlled source processing employs an excitation (transmitter) frequency and sampling rate scheme that ensures powerline harmonics fall at even harmonics of transmitter frequencies and that an integer and binary number of samples per transmitted period are obtained. This allows:

1. improved attenuation of powerline noise;
2. the use of Fast Fourier Transforms in deconvolving excitation irregularities;
3. the use of Fast Fourier Transforms in applying various linear filters; and
4. an early implemented genetalised signal processing approach.

- 26 -

Use is made of Halverson stacking prior to frequency domain transformation. This provides important advantages in:

1. linear drift/noise removal;
2. attenuation of even-harmonics (powerline frequencies in MIMDAS scheme);
3. ability to use metal electrodes as potential electrodes; and
4. quality of grounded line EM coupling information (porous pot electrodes suffer higher contact resistance).

Another feature is that of deconvolution of irregularities in the excitation waveforms by way of estimating frequency responses. Both second order statistics (least-squares) and first order statistics frequency response estimations are made providing an alternative to the problem of bias in least-squares estimators. This provides important advantages in:

1. the calculation time of the deconvolution process;
2. the ability to provide both time and frequency domain responses;
3. the ability to calculate arbitrary periodic time-domain responses (triangular waveform, impulse, square wave with arbitrary duty cycle and ramps, etc);
4. the ability to deconvolve sensor distortion (including capacitive coupling in grounded line responses);
5. correct for amplitude bias in frequency responses due to sensor noise;
6. performing frequency domain telluric cancellation (with frequency dependent telluric coefficients); and
7. the ability to implement filtering with arbitrary frequency domain characteristics.

Preferably also, parametric, frequency domain based telluric cancellation is applied. This feature allows:

1. dramatic reductions in noise levels;

2. factors of 100 or greater productivity during very low frequency surveys;

3. improved mineral and rock type discrimination capabilities (spectral IP);

4. electromagnetics surveys with greatly expanded search depths;

5. simultaneous acquisition of controlled source and natural field responses;

6. response difference parameter (RDP) style telluric cancellation; and 7. possibility of calculating un-biased telluric corrected responses.

It is also preferred that selective stacking or outlier removal is utilised, where appropriate, to provide significant improvements in signal-to-noise ratios.

Preferably, use is also made of a wide range of specifically tailored moving average filters specifically designed for providing dramatic powerline and VLF noise attenuation when viewing time domain responses. These filters also provide an improved approach to the standard quasi-logarithmic boxcar averaging schemes employed in most commercial time-domain induced polarisation and electromagnetics systems.

Another advantageous feature is that of specially designed stacking algorithms for estimating non-linear responses or harmonic distortion. Non-linear induced polarisation responses have the potential of providing enhanced mineral or rock type discrimination.

The natural field processing used in the preferred embodiments employs the following features:

1. A specialised approach to dealing with the problem of bias versus variance in periodogram based response estimation. This method provides a neat alternative to cascade decimation, a standard approach to magnetotellurics processing.

2. In the case of non-cross referenced data, least squares estimators that are optimised for noise in any one of the response measurements - output (usually electric field) or input (usually magnetic field).

Although the invention has been described with reference to a specific example it will be appreciated by those skilled in the art that it may be embodied in many other forms.